US012521578B2

(12) United States Patent
Bailey et al.

(10) Patent No.: US 12,521,578 B2
(45) Date of Patent: Jan. 13, 2026

(54) LINE DISPENSING DEVICES

(71) Applicant: TruBlue LLC, Louisville, CO (US)

(72) Inventors: Carl Andrew Bailey, Boulder, CO (US); Marc Reich, Boulder, CO (US); Ryan Daniel Walker, Superior, CO (US); Stefan Stahl, Boulder, CO (US); Luke Smith, Loveland, CO (US); Nolan Hurd, Golden, CO (US)

(73) Assignee: TruBlue LLC, Louisville, CO (US)

( * ) Notice: Subject to any disclaimer, the term of this patent is extended or adjusted under 35 U.S.C. 154(b) by 1031 days.

(21) Appl. No.: 17/203,157

(22) Filed: Mar. 16, 2021

(65) Prior Publication Data

US 2021/0290986 A1 Sep. 23, 2021

Related U.S. Application Data

(60) Provisional application No. 62/991,467, filed on Mar. 18, 2020.

(51) Int. Cl.

*A62B 1/10* (2006.01)
*A62B 1/08* (2006.01)
*A62B 1/14* (2006.01)
*A62B 1/18* (2006.01)

(52) U.S. Cl.

CPC .................. *A62B 1/10* (2013.01); *A62B 1/08* (2013.01); *A62B 1/14* (2013.01); *A62B 1/18* (2013.01)

(58) Field of Classification Search

CPC .... A62B 1/10; A62B 1/08; A62B 1/14; A62B 1/18; A62B 1/12; A62B 1/00; A62B 35/0093; A62B 35/005

See application file for complete search history.

(56) References Cited

U.S. PATENT DOCUMENTS

| | | | |
|---|---|---|---|
| 2,058,024 | A | 10/1936 | Logan |
| 2,112,312 | A | 3/1938 | Smith |
| 2,122,315 | A | 6/1938 | Fosty et al. |
| 2,409,009 | A | 10/1946 | Bakke |

(Continued)

FOREIGN PATENT DOCUMENTS

| | | |
|---|---|---|
| CN | 1783674 | 6/2006 |
| CN | 202203305 | 8/2011 |

(Continued)

OTHER PUBLICATIONS

Chinese Office Action in Application 202080080391.6, mailed Jan. 18, 2023, 11 pages.

(Continued)

*Primary Examiner* — Brian D Mattei
*Assistant Examiner* — Kathleen M. McFarland
(74) *Attorney, Agent, or Firm* — Merchant & Gould P.C.

(57) ABSTRACT

A line dispensing device includes a housing, a rotatable shaft rotatably supported by the housing and defining a rotational axis, and a line drum disposed about the rotational axis and configured to extend and retract a line from the housing. The line dispensing device also includes a retraction assembly disposed about the rotational axis and configured to generate a retraction force and retract the line from the housing, and a braking assembly disposed about the rotational axis and configured to generate a braking force on the line and during extension of the line from the housing.

18 Claims, 14 Drawing Sheets

(56) References Cited

U.S. PATENT DOCUMENTS 2,428,104 A 9/1947 Winther
2,438,223 A * 3/1948 Lear ........................ F16D 67/06 192/18 R
2,492,776 A 12/1949 Winther
2,771,171 A 11/1956 Schultz
3,364,795 A 1/1968 De Coye De Castelet
3,447,006 A 5/1969 Bair
3,721,394 A 3/1973 Reiser
3,946,989 A * 3/1976 Tsuda ...................... F16D 57/06 188/290
3,962,595 A 6/1976 Eddens
3,967,794 A 7/1976 Fohl
4,078,719 A 3/1978 Durland
4,093,186 A 6/1978 Golden
4,224,545 A 9/1980 Powell
4,271,944 A 6/1981 Hanson
4,306,688 A 12/1981 Hechler, IV
4,416,430 A 11/1983 Totten
4,434,971 A 3/1984 Cordrey
4,511,123 A * 4/1985 Ostrobrod ................ A62B 1/10 254/378
4,544,111 A 10/1985 Nakajima
4,561,605 A 12/1985 Nakajima
4,567,963 A * 2/1986 Sugimoto ................ A62B 1/08 182/236
4,601,438 A 7/1986 Young
4,612,469 A 9/1986 Muramatsu
4,690,066 A 9/1987 Morishita
4,877,110 A * 10/1989 Wolner .............. A62B 35/0093 D29/124
4,934,501 A 6/1990 Gay
4,938,435 A 7/1990 Varner et al.
4,957,644 A 9/1990 Price
5,054,587 A 10/1991 Matsui
5,064,029 A 11/1991 Araki et al.
5,205,386 A 4/1993 Good man et al.
5,342,000 A 8/1994 Berges et al.
5,351,908 A * 10/1994 Umezawa ............. B60R 22/415 242/384.4
5,441,137 A 8/1995 Organek
5,447,280 A 9/1995 Feathers
5,465,815 A 11/1995 Ikegami
5,636,804 A 6/1997 Jeung
5,692,693 A 12/1997 Yamaguchi
5,711,404 A 1/1998 Lee
5,712,520 A 1/1998 Lamb
5,722,612 A * 3/1998 Feathers ............ A62B 35/0093 242/381.5
5,742,986 A 4/1998 Corrion
5,779,178 A 7/1998 McCarty
5,791,584 A 8/1998 Kuriowa
5,822,874 A 10/1998 Nemes
5,862,891 A 1/1999 Kroger
5,928,300 A 7/1999 Rogers
6,041,897 A 3/2000 Saumweber
6,042,517 A 3/2000 Gunther
6,051,897 A 4/2000 Wissler
6,062,350 A 5/2000 Spieldiener
6,086,005 A 7/2000 Kobayashi et al.
6,279,682 B1 * 8/2001 Feathers ............ A62B 35/0093 182/239
6,293,376 B1 9/2001 Pribonic
6,360,855 B1 3/2002 Szu-Yin
6,412,611 B1 7/2002 Pribonic
6,460,828 B1 10/2002 Gersemsky
6,523,650 B1 2/2003 Pribonic
6,553,083 B1 4/2003 Kawai
6,557,673 B1 5/2003 Desta
6,561,451 B1 5/2003 Steinich
6,585,087 B2 7/2003 Lin
6,659,237 B1 12/2003 Pribonic
6,756,870 B2 6/2004 Kuwahara
6,793,203 B2 9/2004 Heinrichs et al.
6,810,997 B2 * 11/2004 Schreiber ................. A62B 1/10 182/233
6,918,469 B1 7/2005 Pribonic
6,962,235 B2 11/2005 Leon
6,973,999 B2 12/2005 Ikuta
7,011,607 B2 3/2006 Kolda et al.
7,014,026 B2 3/2006 Drussel
7,018,324 B1 3/2006 Lin
7,279,055 B2 10/2007 Schuler
7,281,612 B2 10/2007 Hsieh
7,281,620 B2 10/2007 Wolner
7,513,334 B2 4/2009 Calver
7,528,514 B2 5/2009 Cruz et al.
7,870,934 B2 * 1/2011 Ecker ....................... A62B 1/08 182/234
7,894,796 B2 2/2011 Karaoguz et al.
7,918,323 B2 4/2011 Kuo
8,272,476 B2 9/2012 Hartman
8,408,360 B2 4/2013 Postma
8,424,460 B2 4/2013 Lemer
8,490,751 B2 7/2013 Allington et al.
8,511,434 B2 8/2013 Blomberg
8,556,234 B2 10/2013 Hartman
8,567,561 B2 10/2013 Strasser et al.
8,601,951 B2 12/2013 Lemer
8,851,235 B2 10/2014 Allington
8,893,854 B2 * 11/2014 Casebolt ................ B65H 75/48 182/235
8,991,556 B2 3/2015 Auston
9,016,435 B2 4/2015 Allington et al.
9,121,462 B2 * 9/2015 Casebolt ............ A62B 35/0093
9,199,103 B2 12/2015 Hetrich
9,242,128 B2 1/2016 Macy
9,413,218 B2 8/2016 Lo
9,427,607 B2 8/2016 Renton
9,764,172 B2 9/2017 Wolner
9,962,588 B2 5/2018 Allington et al.
10,020,720 B2 * 7/2018 Diehl ........................ B60L 7/28
10,022,570 B2 * 7/2018 Krupp ...................... A62B 1/08
10,065,054 B2 9/2018 Allington
10,333,378 B2 * 6/2019 Lerner ................... H02K 49/04
10,426,982 B2 * 10/2019 Bornack ............ A62B 35/0075
10,518,115 B2 12/2019 Allington
10,661,106 B2 * 5/2020 Choate ............... A62B 35/0093
11,123,580 B2 * 9/2021 Allington ............... H02K 49/04
11,938,350 B2 * 3/2024 Jones ................. A62B 35/0093
2002/0162477 A1 11/2002 Palumbo
2002/0179372 A1 * 12/2002 Schreiber ................. A62B 1/10 182/238
2003/0116391 A1 6/2003 Desta
2003/0158016 A1 8/2003 Kolda et al.
2003/0211914 A1 11/2003 Perkins
2004/0055836 A1 3/2004 Pribonic
2004/0073346 A1 4/2004 Roelleke
2004/0168855 A1 9/2004 Leon
2004/0194101 A1 9/2004 Bytnar
2005/0117258 A1 6/2005 Ohta
2005/0189830 A1 9/2005 Corbin, III
2005/0263356 A1 12/2005 Marzano
2006/0278478 A1 12/2006 Pribonic
2007/0000741 A1 1/2007 Pribonic
2007/0001048 A1 1/2007 Wooster
2007/0135561 A1 6/2007 Rath
2007/0215410 A1 * 9/2007 Ecker ................. A62B 35/0093 182/192
2007/0228202 A1 10/2007 Scharf et al.
2007/0228713 A1 10/2007 Takemura
2007/0256906 A1 11/2007 Feng
2008/0059028 A1 3/2008 Willeron
2008/0074223 A1 3/2008 Pribonic
2008/0087510 A1 4/2008 Pribonic
2008/0105503 A1 5/2008 Pribonic
2008/0106420 A1 5/2008 Rohlf
2008/0135579 A1 6/2008 Bertram
2009/0026303 A1 1/2009 Schmitz et al.
2009/0032785 A1 2/2009 Jones
2009/0084631 A1 * 4/2009 Casebolt .................. A62B 1/10 182/235

(56) References Cited

U.S. PATENT DOCUMENTS

2009/0084883 A1* 4/2009 Casebolt ................ B65H 75/48 242/389
2009/0114892 A1 5/2009 Lesko
2009/0166459 A1 7/2009 Niitsuma et al.
2009/0178887 A1* 7/2009 Reeves .................... A62B 1/10 182/239
2009/0211846 A1 8/2009 Taylor
2009/0249712 A1 10/2009 Brickell
2010/0032255 A1 2/2010 Conti
2010/0065373 A1 3/2010 Stone et al.
2010/0112224 A1 5/2010 Lott
2010/0116922 A1 5/2010 Choate
2010/0211239 A1 8/2010 Christensen et al.
2010/0224448 A1* 9/2010 Wolner .................... A62B 1/10 182/234
2010/0226748 A1* 9/2010 Wolner .............. A62B 35/0093 414/815
2011/0073697 A1* 3/2011 Koh ................... A01K 89/0155 242/288
2011/0084158 A1* 4/2011 Meillet .............. A62B 35/0093 242/385.4
2011/0114907 A1* 5/2011 Hartman .................. A62B 1/08 254/268
2011/0147125 A1* 6/2011 Blomberg ............ H02K 49/043 188/161
2011/0174914 A1* 7/2011 Yang ........................ A62B 1/10 242/395.1
2011/0175473 A1 7/2011 Kitabatake
2011/0240403 A1 10/2011 Meillet
2011/0297778 A1 12/2011 Meillet
2012/0055740 A1* 3/2012 Allington ................ F16D 59/00 182/231
2012/0118670 A1 5/2012 Olson
2012/0312540 A1 12/2012 Lefebvre
2013/0048422 A1 2/2013 Hartman
2013/0087433 A1 4/2013 Sejourne
2013/0118842 A1 5/2013 Lerner
2013/0140112 A1 6/2013 Walter
2013/0186721 A1 7/2013 Bogdanowicz et al.
2014/0048639 A1* 2/2014 Allington ................ F16D 59/00 242/396
2014/0110947 A1 4/2014 Mongeua
2014/0224597 A1 8/2014 Takezawa
2014/0346909 A1 11/2014 Vogler
2014/0375158 A1 12/2014 Allington
2015/0266454 A1 9/2015 McGowan
2015/0352380 A1 12/2015 Huang
2016/0311642 A1* 10/2016 Blair .................. B65H 75/4442
2016/0317936 A1 11/2016 Diehl
2016/0360738 A1 12/2016 Richardson
2017/0237313 A1 8/2017 Diehl
2017/0274261 A1 9/2017 Allington
2017/0328424 A1 11/2017 Allington
2017/0333735 A1* 11/2017 Krupp .................... H02K 7/104
2017/0338728 A1 11/2017 Diehl
2018/0221743 A1 8/2018 Allington et al.
2018/0296860 A1* 10/2018 Krupp ...................... A62B 1/08
2019/0015687 A1 1/2019 Knickrehm
2019/0109528 A1* 4/2019 Lerner ................... A63G 21/22
2019/0275356 A1* 9/2019 Jones ................. A62B 35/0093
2021/0086002 A1 3/2021 Bailey
2021/0290986 A1* 9/2021 Bailey ...................... A62B 1/14

FOREIGN PATENT DOCUMENTS

CN 102497085 6/2012
CN 102627063 8/2012
CN 103244577 4/2013
CN 103326538 9/2013
CN 109310892 A 2/2019
CN 109983202 A 7/2019
CN 209253971 U 8/2019
DE 9300966 3/1993
DE 102005032694 1/2007
EP 460494 12/1991
EP 1244565 10/2002
EP 1401087 3/2004
EP 1432101 6/2004
EP 1480320 11/2004
EP 1564868 8/2005
EP 2359911 8/2011
EP 3002045 4/2016
GB 721748 1/1955
GB 908128 10/1962
GB 2352644 2/2001
GB 2352645 2/2001
GB 2352784 2/2001
GB 2357563 6/2001
JP H-05296287 11/1993
JP 10098868 4/1998
JP 10140536 5/1998
JP 10252025 9/1998
JP 1998252025 A 9/1998
JP 11119680 4/1999
JP 11189701 7/1999
JP 11315662 11/1999
JP 2000-316272 11/2000
JP 2001-17041 1/2001
JP 5296287 6/2013
WO 95/16496 6/1995
WO 96/17149 6/1996
WO 97/34360 9/1997
WO 98/47215 10/1998
WO 200138123 5/2001
WO 2003055560 7/2003
WO 2007/106207 9/2007
WO 2008139127 11/2008
WO 2009/000015 12/2008
WO 2009047469 4/2009
WO 2009108040 9/2009
WO 2009127142 10/2009
WO 2011079266 6/2011
WO 2017/201512 11/2017

OTHER PUBLICATIONS

Climbing Wall Descent Controllers—Instruction Manual v3. Aug. 18, 2008, pp. 1-20.
MSA, The Safety Company, Stop Use Notice for Redpoint and Auto-Belay Descenders, dated Oct. 14, 2009, 1 page.
TruBlue Auto Belay User Manual, Model TB150-12C, pp. 1-25.
PCT Invitation to Pay Fees and Partial Search Report in Application PCT/US2020/051492, mailed Jan. 20, 2021, 23 pages.
PCT International Search Report and Written Opinion in International Application PCT/US2020/051492, mailed Mar. 15, 2021, 27 pages.
PCT International Preliminary Report on Patentability in International Application PCT/US2021/022585, mailed Sep. 29, 2022, 9 pages.
PCT International Search Report and Written Opinion in International Application PCT/US2021/022585, mailed Jul. 15, 2021, 19 pages.
KEB America, Electromagnetic Brakes (Power-on), posted Aug. 18, 2015, video: https://youtu.be/RNdXn2ecOWI?si=KS1r0qz3CjosvsKe, 1:39 in duration.
EP Communication in 20797240.7, mailed Dec. 22, 2023, 5 pages.
Chinese 1st Office Action in Application in Application 202080080391.6, mailed Jan. 18, 2023, 13 pages.
Chinese 2nd Office Action in Application in Application 202080080391.6, mailed Aug. 2, 2023, 4 pages.
PCT International Preliminary Report on Patentability in International Application PCT/US2020/051492, mailed Mar. 31, 2022, 17 pages.

* cited by examiner

LINE DISPENSING DEVICES

CROSS-REFERENCE TO RELATED APPLICATIONS

This application claims priority to and the benefit of U.S. Provisional Application No. 62/991,467, filed Mar. 18, 2020, which is incorporated by reference herein in its entirety.

INTRODUCTION

Line dispensing devices, such as auto-belay devices used for climbing or descender devices for workers or conveyances, can be used to protect against falls by retracting slack when the line is not under load and providing a braking force when the line is loaded, so that the weight (e.g., climber) on the end of the line descends at a safe speed. Line dispensing devices can include various braking systems that generate the braking forces. These braking systems can include friction-based systems, hydraulic-based systems, electromagnetic-based systems, and magnetic-based systems (e.g., an eddy current braking mechanism).

LINE DISPENSING DEVICES

This disclosure describes examples of a line dispensing device, such as an auto belay device used for climbing activities or descender devices for workers or conveyances. In the line dispensing device described herein, features are described that increase the performance of the device. For example, increased reactivity of the braking and retraction assemblies so that the device is more responsive to climbers needs. In another example, the life-cycle of the device is increased by increasing its loading capacity. Additionally, features are described that increase manufacturing and assembly efficiencies. For example, the entire device is enabled to be more quickly and accurately assembled and disassembled (e.g., during service and inspection processes). Accordingly, a higher performing and more efficient line dispensing device is provided.

In an aspect, the technology relates to a line dispensing device including: a housing; a rotatable shaft rotatably supported by the housing and defining a rotational axis; a line drum disposed about the rotational axis and configured to extend and retract a line from the housing; a retraction assembly disposed about the rotational axis and configured to generate a retraction force and retract the line from the housing; and a braking assembly disposed about the rotational axis and configured to generate a braking force on the line and during extension of the line from the housing.

In an example, the braking assembly includes a rotor assembly having one or more conductors and a stator assembly having one or more magnets, and the rotor assembly is coupled to the rotatable shaft and rotatable around the rotational axis so as to generate an eddy current braking force. In another example, the stator assembly includes a pair of plates each having a plurality of keys extending therefrom, and the one or more magnets are coupled to the pair of plates and the plurality of keys at least partially define a polarity orientation of the one or more magnets. In yet another example, the line drum is coupled to the rotatable shaft and rotatable around the rotational axis, and the line drum is rotatable around the rotational axis at a different speed than the rotatable shaft. In still another example, a transmission is coupled between the line drum and the rotatable shaft so that rotation of the line drum drives rotation of the rotatable shaft. In an example, the retraction assembly is coupled to the line drum and rotatable around the rotational axis, and the retraction assembly is rotatable around the rotational axis at a different speed than the rotatable shaft.

In another example, one end of the rotatable shaft includes a female spline connector configured to receive another exterior shaft and drive rotation thereof. In yet another example, the braking assembly is an eddy current braking device, a hydraulic braking device, a friction braking device, or an electromagnetic braking device.

In another aspect, the technology relates to a line dispensing device including: a line drum housing a line and configured to rotate about a rotational axis during extension and retraction of the line; a rotatable shaft rotatable around the rotational axis; and a transmission extending between the line drum and the rotatable shaft so that rotation of the line drum drives corresponding rotation of the rotatable shaft.

In an example, the transmission includes: a sun gear coupled to the rotatable shaft; an internal gear co-axial with the sun gear and fixed relative to the rotational axis; and a plurality of planet gears meshed with the sun gear and the internal gear, the plurality of planet gears are supported on the line drum. In another example, the line drum includes: a pair of drum plates; and a hub supported on the rotatable shaft, the line is wrapped around the hub and disposed between the pair of drum plates, and the hub includes a pair of substantially parallel planer surfaces. In yet another example, the hub further includes at least one arcuate projection configured to receive at least a portion of a short webbing for coupling the line to the line drum. In still another example, a housing has a nozzle that the line extends through, the nozzle includes a pair of covers that are pivotably coupled to the housing. In an example, a guide roller is proximate the nozzle, the guide roller is rotatably supported by a pair of shoulders defined by the housing.

In another example, a retraction assembly is coupled to the line drum, the retraction assembly includes: a hub supported on the rotatable shaft; a coil spring coupled to the hub; and a pair of flexible plates sandwiching the coil spring therebetween.

In another aspect, the technology relates to a line dispensing device including: a housing defining an interior cavity and an external cavity; a rotatable shaft rotatably supported by the housing and defining a rotational axis, wherein one end of the rotatable shaft is cantilevered within the external cavity; and a braking assembly at least partially disposed within the external cavity and configured to apply a braking force on the rotatable shaft, wherein the braking assembly includes: a stator assembly coupled to the housing; and a rotor assembly coupled to the rotatable shaft and rotatable around the rotational axis.

In an example, the stator assembly includes a pair of plates that have an outer perimeter with one or more male pins that selectively engage with corresponding female receptors defined within the external cavity. In another example, the rotor assembly includes: a pair of rotor plates having at least one bent tab extending therefrom; one or more conductors pivotably coupled to the pair of rotor plates; and at least one biasing element extending between the at least one bent tab and the one or more conductors. In yet another example, the biasing element includes hooks or loops at each end that directly engage with the at least one bent tab and the one or more conductors. In still another example, the line dispensing device further includes: a line drum supported on the rotatable shaft and configured to rotate around the rotational axis; and a retraction assembly supported on the rotatable shaft and configured to rotate around the rotational axis. In an example, the housing defines at least one mounting aperture, and a bushing is coupled to the at least one mounting aperture.

These and various other features as well as advantages that characterize the line dispensing devices described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
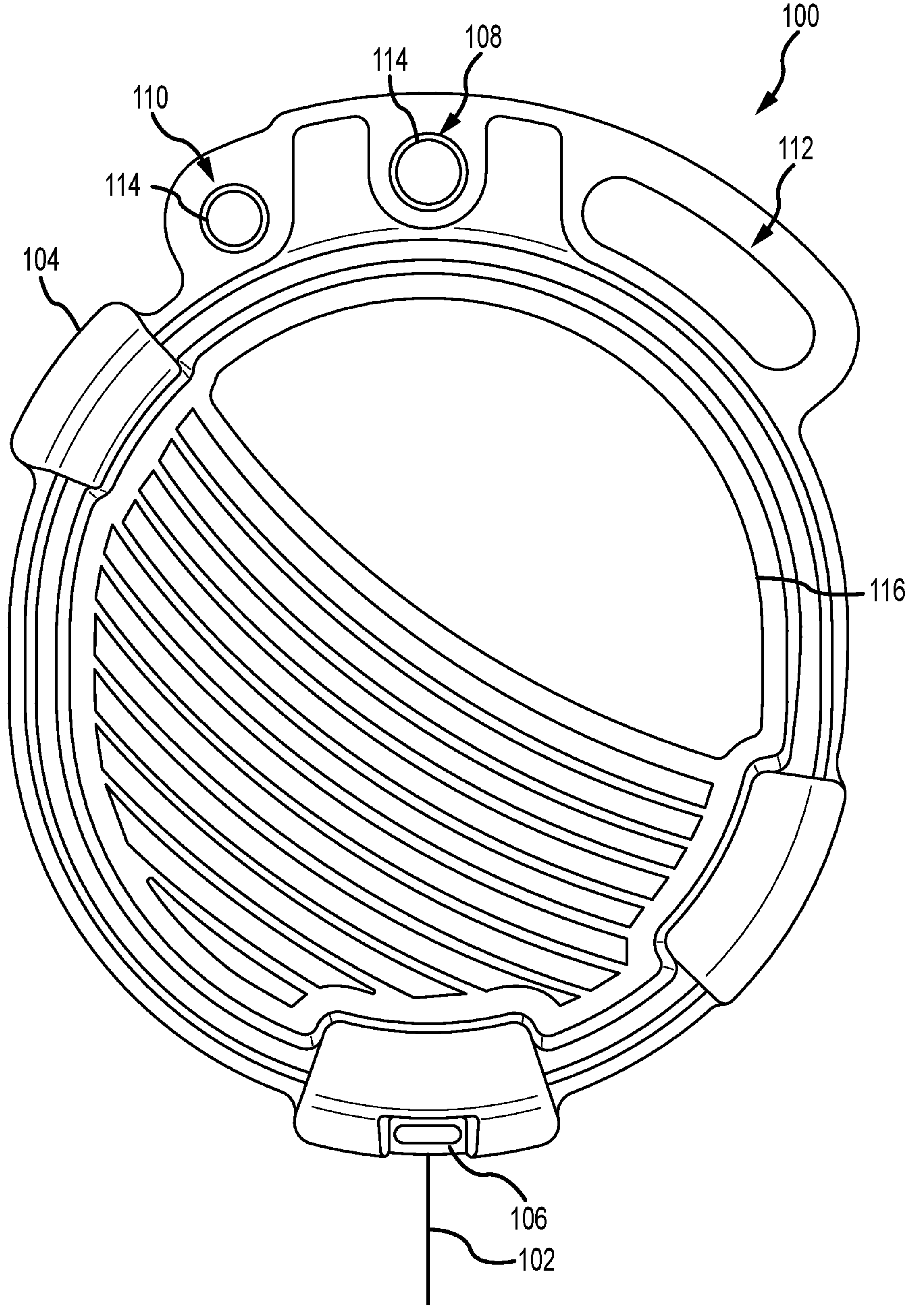
FIG. 1 is a side view of an exemplary line dispensing device.

This disclosure describes examples of a line dispensing device, such as an auto belay device used for climbing activities. Although, the features of the line dispensing device described herein can also be used in any other line braking system (e.g., industrial or occupational descender devices, such as personnel, equipment, or training, recreational descender devices, such as conveyances, rides, trolleys, ziplining, free-fall devices, and the like) as required or desired. The line dispensing device provides various improvements for an eddy current braking assembly so as to generate a braking force on the line and control descent of a load attached to the line. However, it should be appreciated that improvements to other operational systems (e.g., line drums, retraction assemblies, etc.) can be used in any other type of line dispensing device (e.g., frictional braking, hydraulic braking, electromagnetic braking, etc.).

In the line dispensing device described herein, features are described that increase the performance of the device. For example, increased reactivity of the braking and retraction assemblies so that the device is more responsive to climbers needs. In another example, the life-cycle of the device is increased by increasing its loading capacity. Additionally, features are described that increase manufacturing and assembly efficiencies. For example, the entire device is enabled to be more quickly and accurately assembled and disassembled (e.g., during service and inspection processes). Accordingly, a higher performing and more efficient line dispensing device is provided.

The line dispensing device includes a housing with an interior cavity and an exterior cavity and a rotatable shaft rotatably mounted thereto. A braking assembly is at least partially coupled to the rotatable shaft and disposed in the exterior cavity. A line drum that houses a main line for the device and a retraction assembly are supported on the rotatable shaft and disposed in the interior cavity. By separating the braking assembly from the rest of the device components, heat generated during use is more efficiently dissipated, thereby increasing performance. Additionally, the braking assembly uses a rotor assembly and a stator assembly so as to decrease the number of rotating components in the device. This results in a system that has a decreased mass and a more efficient rotational moment of inertia when extending and retracting the loaded line.

Additional features of the line dispensing device include components that are sized and shaped to be coupled together in only one orientation and direction. This reduces the overall number of components and increases assembly and disassembly efficiencies. A redundant transmission system is utilized to couple the line drum to the rotatable shaft to drive rotation thereof. By creating a redundant system, the torque loads induced across each component are reduced, thereby increasing the life-cycle capabilities of the device. Further improvements include a nozzle that does not completely release from the housing so that line maintenance and replacement is easier and component parts are not lost or dropped. Many other features of the line dispensing device are described further below.

As used herein, the terms “axial” and “longitudinal” refer to directions and orientations, which extend substantially parallel to a centerline of the component or system. Moreover, the terms “radial” and “radially” refer to directions and orientations, which extend substantially perpendicular to the centerline of the component or system. In addition, as used herein, the term “circumferential” and “circumferentially” refer to directions and orientations, which extend arcuately about the centerline of the component or system.

FIG. 1 is a side view of an exemplary line dispensing device 100. The line dispensing device 100 includes a main line 102 that is configured to be attached to a user (e.g., climber) via a carabiner (not shown), and can be retracted into a housing 104 as the user climbs and be controllably extended when loaded (e.g., when the climber falls). As used herein, the term “line” refers to any cable, rope, string, chain, wire, webbing, strap, or any other length of flexible material. The line dispensing device 100 has a nozzle 106 disposed at a bottom end of the housing 104 that is configured to enable the line 102 to extend out of the housing 104. The nozzle 106 is described further below in reference to FIGS. 13-14. At the top end of the housing 104, a mounting aperture 108 is formed. Additionally, a secondary mounting aperture 110 and a handle 112 are formed to either side of the mounting aperture 108. The mounting apertures 108, 110 are configured to couple the line dispensing device 100 to a support structure (e.g., a climbing wall).

In some examples, a bushing 114 may line the apertures 108, 110. The bushing 114 decreases wear on the housing 104 from the coupling device(s) (e.g., a carabiner) and are replaceable as required or desired. Additionally, the bushing 114 can decrease friction between the housing 104 and the coupling device(s) so that the line dispensing device 100 can more easily move around during use. Furthermore, the bushing 114 can reduce dynamic vibrations (e.g., provide a damper) between the line dispensing device 100 and the support structure. These vibrations may generate a resonance condition that is undesirable. One example of the bushing 114 is described further below in reference to FIGS. 16-17. In the example, one or more covers 116 can at least partially cover the housing 104. The cover can be utilized to cover components and/or provide a surface for product identification and/or color. In an aspect, the cover 116 is attached with molded tabs that connect with the housing 104. In other aspects, the cover 116 can be attached with one or more fasteners (e.g., bolts).

Figure 2:
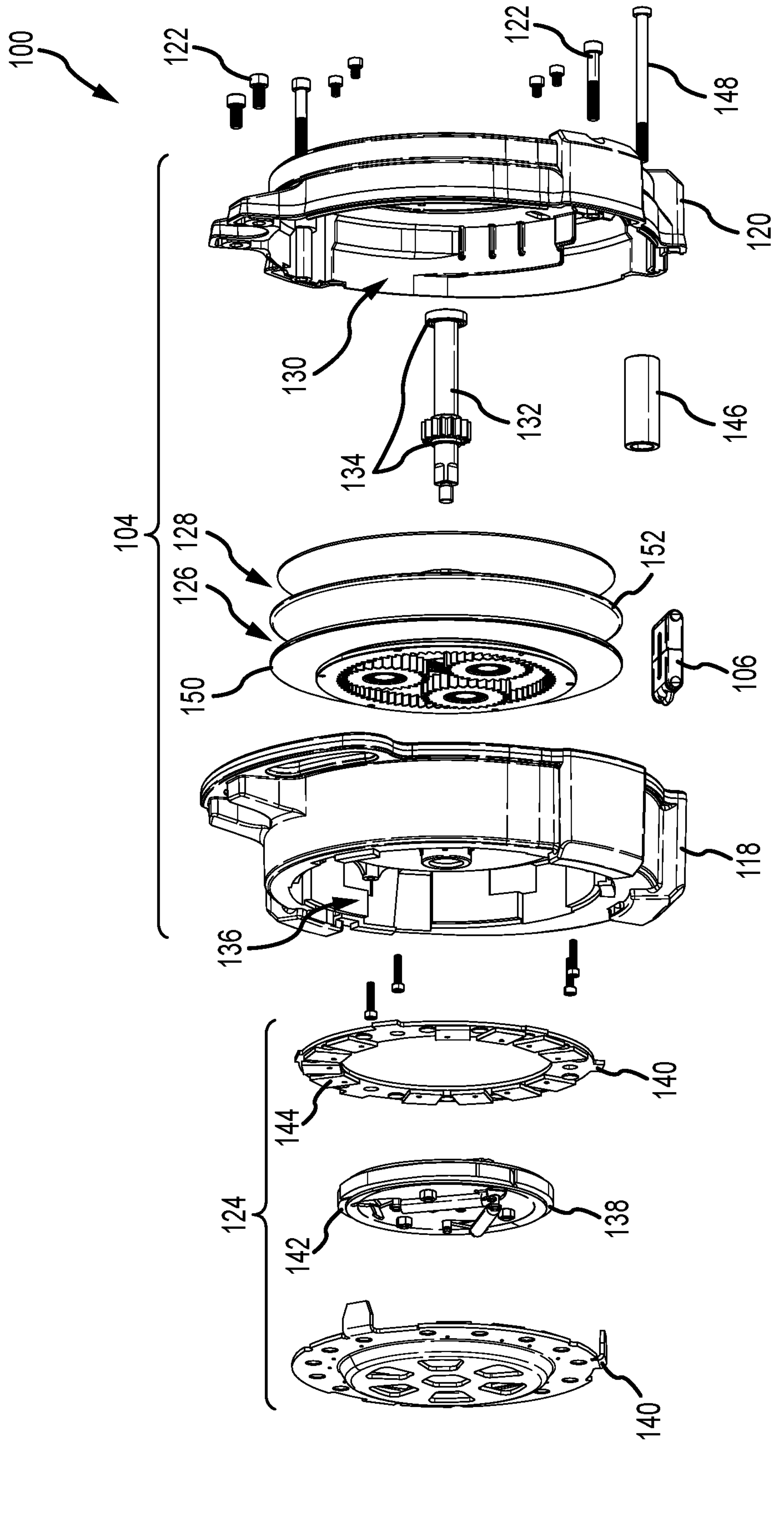
FIG. 2 is an exploded perspective view of the line dispensing device.

FIG. 2 is an exploded perspective view of the line dispensing device 100. The main line 102 and the cover 116 (both shown in FIG. 1) are not illustrated for clarity. In the example, the housing 104 is a two piece housing 118, 120 that is coupled together with a plurality of fasteners 122 (e.g., bolts). This coupling allows for the components within the housing 104 to be accessed for inspection and maintenance. The line dispensing device 100 includes a braking assembly 124 that is configured to apply a braking force to the line as it extends, a line drum 126 configured to house the line and allow the line to extend and retract therefrom, and a retraction assembly 128 that is configured to retract the line when the line is not loaded. The retraction assembly 128 includes coil spring (not shown) that provides the retraction force. The line drum 126 is described further below in reference to FIGS. 8-10 and the retraction assembly 128 is described further below in reference to FIG. 11.

In the example, the housing 104 forms an interior cavity 130 via the housing sections 118, 120. The line drum 126 and the retraction assembly 128 are disposed within the interior cavity 130. Additionally, both the line drum 126 and the retraction assembly 128 are supported on a rotatable shaft 132 that is rotatably supported within the housing 104 by a pair of bearings 134. In the example, both the line drum 126 and the retraction assembly 128 are rotatable within the housing 104. The braking assembly 124 is disposed outside of the interior cavity 130 and within an exterior cavity 136 formed on one of the housing sections 118. It should be appreciated that the cover 116 may at least partially cover the braking assembly 124 so that it is not completely exposed on the line dispensing device 100.

The rotatable shaft 132 enables increased safety of the line dispensing device 100 (e.g., gear redundancy), increased functionality of the line dispensing device 100 (e.g., attachment of one or more accessory mechanisms), and increased ability to more reliably and accurately sense, track, and be responsive to status conditions of components (e.g., velocity, change of directions, amount of line dispensed, etc.) during operation of the line dispensing device 100 and as described further herein. In contrast, most, if not all, currently known line dispensing devices have a fixed shaft with components that rotate relative to the fixed shaft.

The braking assembly 124 includes a rotor assembly 138 and a stator assembly 140. The rotor assembly 138 is coupled to the rotatable shaft 132 and thus is also rotatable within the line dispensing device 100. In contrast, the stator assembly 140 is coupled to the housing section 118 and thus is fixed with respect to rotation. In the example, the braking assembly 124 is an eddy current braking mechanism with the rotor assembly 138 having a plurality of conductors 142 and the stator assembly 140 having a plurality of magnets 144. In operation, upon rotation of the rotor assembly 138 the generated centrifugal forces radially displace the conductors 142 in a direction towards the magnets 144 so that braking forces are generated. The braking assembly 124 is described further below in reference to FIGS. 4-7. Additionally, eddy current braking mechanisms similar in function for line dispensing devices are described in U.S. Pat. Nos. 8,490,751 and 8,851,235, both of which are hereby incorporated by reference herein in their entirety. As described herein, the braking assembly 124 is an eddy current braking device. It should be appreciated, however, that the braking assembly 124 could be any other braking device that enables the line dispensing device 100 to function as described herein. For example, the braking device could be a hydraulic braking device, a friction braking device (e.g., drum and pads or rotor and pads), an electromagnetic braking device, or the like.

In the example, the rotatable shaft 132 is supported on the housing sections 118, 120 by the pair of bearings 134 and one bearing 134 is offset and inwards from one end of the shaft 132. As such, one end of the rotatable shaft 132 cantilevers into the exterior cavity 136 and supports the rotor assembly 138. In an aspect, the cantilevered end of the rotatable shaft 132 is shorter in length than the length of the shaft 132 between the bearings 134. In the example, the line drum 126 and the retraction assembly 128 are each disposed between the bearings 134 on the rotatable shaft 132.

By isolating the braking assembly 124 from the line drum 126 and the retraction assembly 128, thermal control of the braking assembly 124 is increased, thereby increasing performance of the line dispensing device 100. During operation of the braking assembly 124, eddy current braking forces can generate heat. The housing section 118 can act as a thermal barrier to reduce or prevent heat from adversely affecting the line drum 126 and the retraction assembly 128. Furthermore, the exterior cavity 136 can be more effectively passively cooled, (e.g., via vents) with only the braking assembly 124 disposed therein. Additionally, by reducing the span lengths of the rotatable shaft 132 that support the operational systems, bending forces are reduced on the shaft 132, thereby increasing performance and resistance to wear (e.g., from shipping and maintenance).

Furthermore, in this example, the number and size of rotatable components are decreased, thereby also decreasing mass. For example, the magnets 144 are stationary and not rotatable. Additionally, all of the rotatable components rotate around a single rotational axis. Thus, the inertia of the rotatable components is reduced so that the braking assembly 124 and the retraction assembly 128 are faster to respond during operation of the line dispensing device 100 since they are at least partially dependent on rotation. This configuration results in increase responsiveness to user's climbing movements and improved performance.

The line dispensing device 100 also includes a guide roller 146 that is disposed proximate the nozzle 106. When the line 102 wraps and unwraps from the line drum 126, the line rolls over the guide roller 146 so as to position the line relative to the nozzle 106 and exit from the housing 104, as well as inducing a smoother extension and retraction of the line without twisting thereof. In the example, the guide roller 146 is rotatable about a fastener 148 that is also used to couple the two housing sections 118, 120 together. The guide roller 146 is also elongated in the axial direction. In an aspect, the axial length of the guide roller 146 is twice or more the thickness of the line 102. In another aspect, the axial length of the guide roller 146 is greater than the axial distance between two drum plates 150, 152 of the line drum 126 and which the line is disposed between. The guide roller 146 is described further below in reference to FIG. 15

Figure 3:
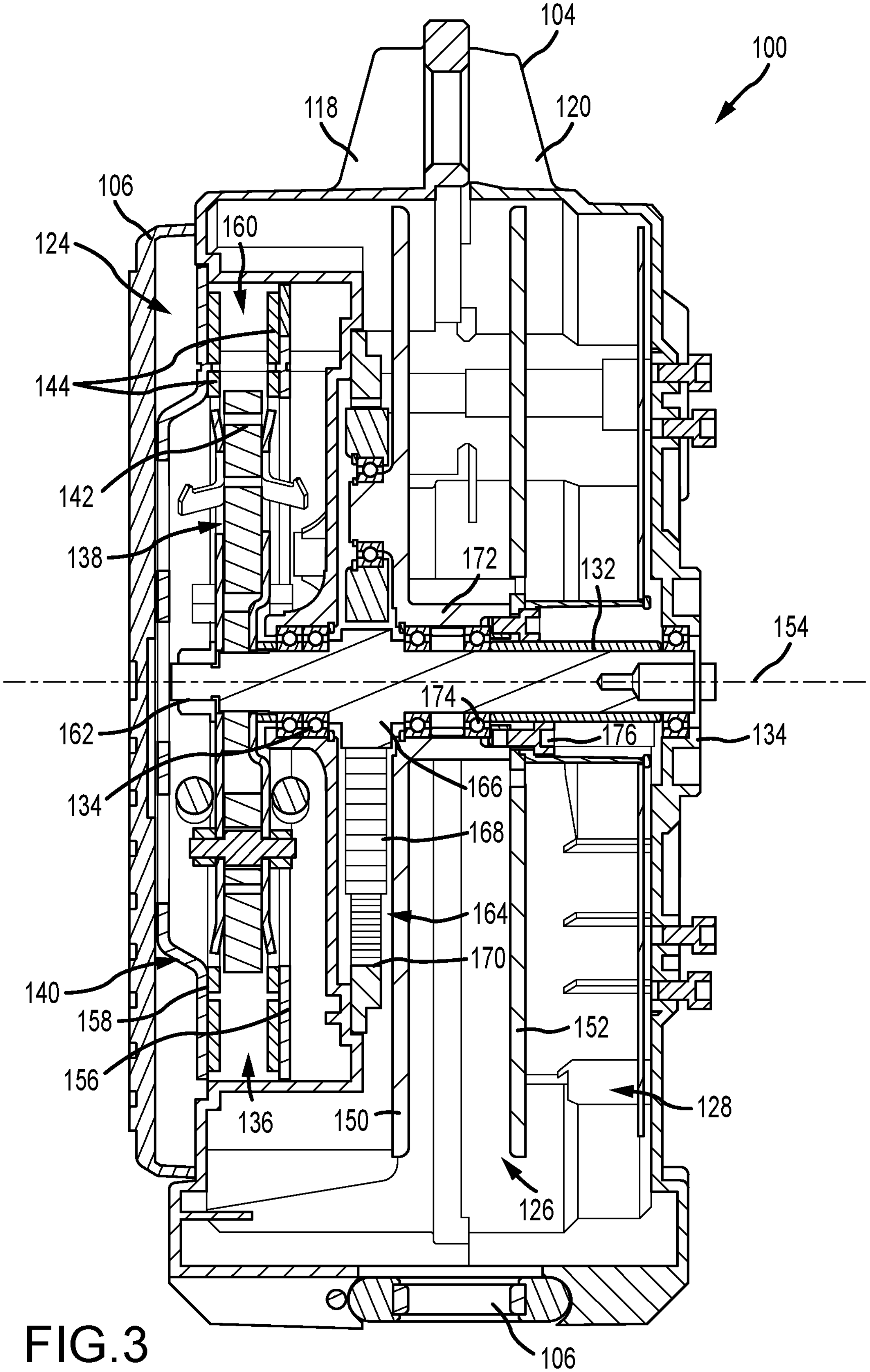
FIG. 3 is a cross-sectional view of the line dispensing device.

FIG. 3 is a cross-sectional view of the line dispensing device 100. Certain components are described above, and thus, are not necessarily described further. The rotatable shaft 132 defines a rotational axis 154 that a number of components rotate about. The rotatable shaft 132 is rotatably coupled to and supported by the housing sections 118, 120 at the bearings 134 so that the shaft 132 can rotate around the axis 154. The cantilevered end of the rotatable shaft 132 is disposed within the exterior cavity 136 of the housing section 118. The cantilevered end is coupled to the rotor assembly 138 of the braking assembly 124 so that rotation of the rotatable shaft 132 directly drives the rotor assembly 138 (e.g., during operation the shaft 132 and the rotor assembly 138 rotate at the same speed). The braking assembly 124 also includes the stator assembly 140 which the rotor assembly 138 and the rotatable shaft 132 rotates relative thereto. The stator assembly 140 includes an inside plate 156 supporting a plurality of magnets 144 and an outside plate 158 supporting a plurality of magnets 144. Both plates 156, 158 are supported by the housing section 118 and fixed relative to the rotational axis 154. The magnets 144 of each plate 156, 158 face each other and a gap 160 is formed therebetween. The rotor assembly 138 includes a plurality of conductors 142 that can be displaced at least partially into the gap 160 so as to generate a braking force. The rotor assembly 138 is coupled to the rotatable shaft 132 by a nut 162.

The rotatable shaft 132 is coupled to the line drum 126 by a transmission 164 so that rotation of the line drum 126 can drive rotation of the rotatable shaft 132. In the example, the transmission 164 is a planetary gear system with a sun gear 166 that is coupled to and extends from the rotatable shaft 132. In an aspect, the sun gear 166 is a spur gear. The planetary gear system also includes a plurality of planet gears 168 that are rotatably coupled to one of the drum plates 150 and an internal gear 170 coupled to and fixed to the housing section 118. The planet gears 168 are meshed with both the sun gear 166 and the internal gear 170, and in an aspect, are spur gears. The line drum 126 also includes a hub 172 that at least partially surrounds the rotatable shaft 132 and between the drum plates 150, 152. In the example, the hub 172 is supported on the rotatable shaft 132 by one or more bearings 174, and as such, the line drum 126 can rotate around the rotational axis 154 at a different rotational speed than the rotatable shaft 132.

The retraction assembly 128 is directly coupled to the hub 172 so that it rotates with the line drum 126. In the example, one or more fasteners 176 (e.g., bolts) couple the retraction assembly 128 to the hub 172 of the line drum 126. In FIG. 3, the coil spring that provides retraction forces to the system is not illustrated for clarity. Additionally, the main line 102 (shown in FIG. 1) that is configured to wrap and unwrap about the hub 172 of the line drum 126 is not illustrated for clarity.

In operation, the line 102 is wrapped at least partially around the hub 172 and a free end extends out of the housing 104 via the nozzle 106. When the line 102 is extended and not loaded (e.g., a climber climbing up a climbing wall), the retraction assembly 128 is configured to rotate the line drum 126 around the rotational axis 154 so as to retract the line 102 back into the housing 104 and wrap around the hub 172. This rotation of the line drum 126, via the retraction assembly 128, induces a corresponding, but not necessarily equal, rotation in the rotatable shaft 132 via the transmission 164. The rotor assembly 138 also rotates via the rotatable shaft 132. In the example, the braking assembly 124 generates an eddy current braking force during retraction of the line 102 via retraction assembly 128 so as to decrease wear on the coil spring of the retraction assembly 128. Additionally, by generating a braking force during retraction of the line 102, the retraction of the line is more controlled, for example, during unanticipated line releases.

When the line 102 is loaded (e.g., a climber falling from the wall), the line drum 126 is configured to rotate in the other direction, which overcomes the retraction force generated by the retraction assembly 128, so that the line 102 extends from the housing 104 and unwraps from the hub 172. This rotation of the line drum 126 induces a corresponding, but not necessarily equal, rotation in the rotatable shaft 132 via the transmission 164 to drive rotation of the rotor assembly 138 and extend the conductors 142 into the magnetic field of the magnets 144. This generates an eddy current braking force on the rotatable shaft 132 to control the extension of the line from the housing 104 and the descent rate of the load attached thereto.

Figure 4:
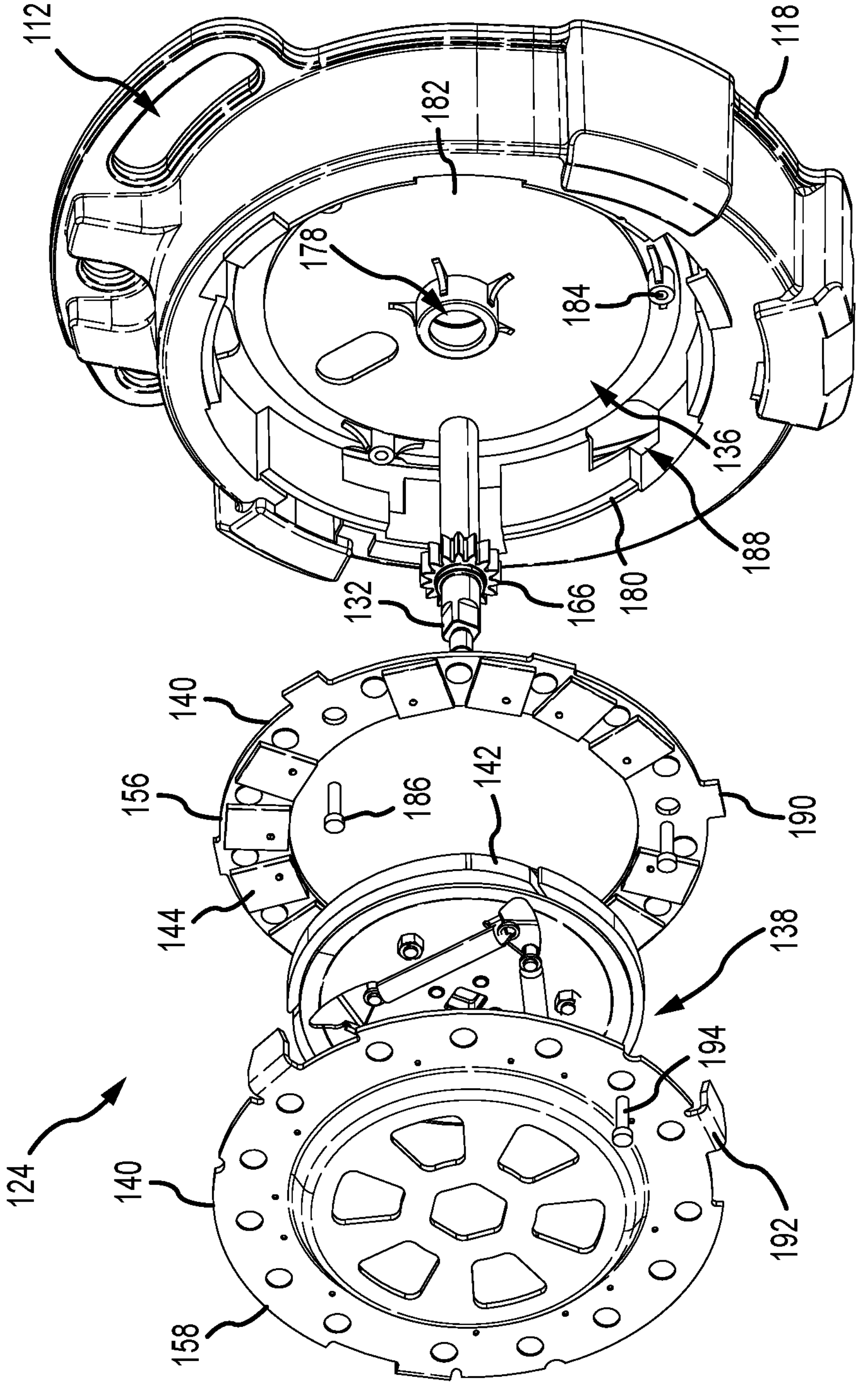
FIG. 4 is an exploded perspective view of a braking assembly of the line dispensing device.

FIG. 4 is an exploded perspective view of the braking assembly 124. Certain components are described above, and thus, are not necessarily described further. The braking assembly 124 is disposed at least partially within the exterior cavity 136 of the housing section 118. The housing section 118 has a center opening 178 that is sized and shaped to support the rotatable shaft 132 via the bearing 134 (shown in FIG. 3). The exterior cavity 136 is formed by a side wall 180 and a base wall 182. The side wall 180 is a radial side wall relative to the rotational axis of the rotatable shaft 132. The base wall 182 extends substantially orthogonally to the rotational axis of the rotatable shaft 132 and can provide a thermal barrier for the components disposed within housing and with respect to the braking assembly 124. Additionally, the base wall 182 can include one or more mounting posts 184 that receive fasteners 186 so as to secure the inside magnet plate 156 to the housing section 118. The side wall 180 includes one or more female receptors 188 that are sized and shaped to receive corresponding male pins 190, 192 on the plates 156, 158 in a bayonet type coupling connection. The outside magnet plate 158 can further be secured to the housing section 118 with one or more fasteners 194 (e.g., bolts).

In the example, the female receptors 188 within the side wall 180 can receive both male pins 190, 192 from each plate 156, 158. As such, when the plates 156, 158 are mounted to the housing section 118, the male pins 190, 192 can be positioned circumferentially offset from one another. By utilizing the structure of the housing section 118 as supports and connectors to the stator assembly 140, efficiency and performance of the line dispensing device is increased. For example, assembly efficiencies are increased as the braking assembly 124 can only fit together in one configuration and there are less overall components to assemble. Additionally, performance is increased because the number of rotating components are decreased. Furthermore, although a bayonet type coupling connection is shown and described, it is appreciated that the stator assembly 140 can be mounted within the exterior cavity 136 via any other connection type as required or desired. In other examples, the male pins 190 on the inside magnet plate 156 need not to be used, and the inside magnet plate 156 can be only coupled to the housing section 118 via fasteners 186. In still other examples, the male pins on the inside magnet plate 156 can be replaced by one or more notches (not shown) that are configured to engage with one or more corresponding protrusions (not shown) disposed within the exterior cavity 136 of the housing section 118. In this example, the notches and protrusions are utilized for orienting the inside magnet plate 156 with respect to the housing section 118.

Figure 5:
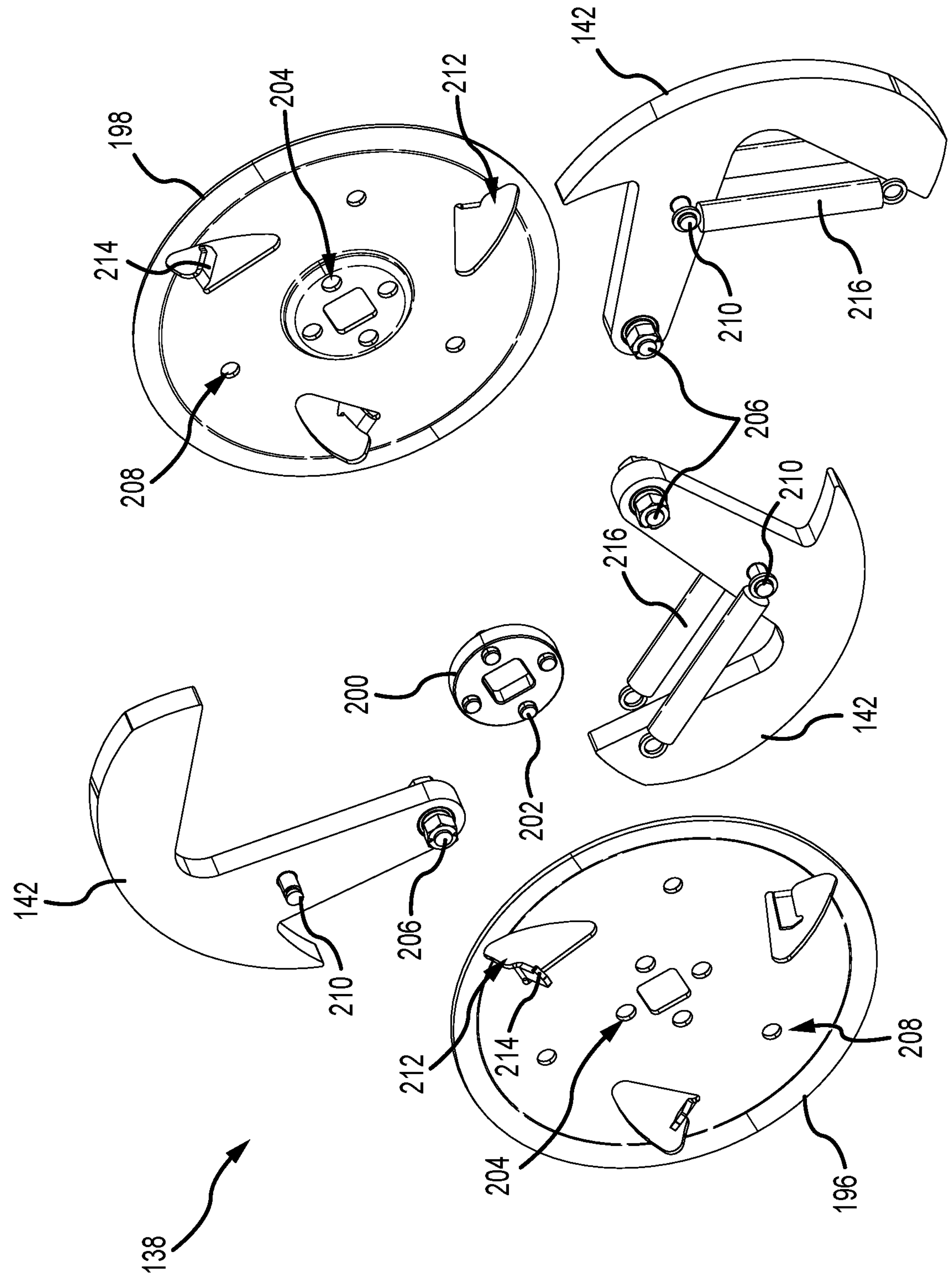
FIG. 5 is an exploded perspective view of a rotor assembly of the braking assembly.

FIG. 5 is an exploded perspective view of the rotor assembly 138 of the braking assembly 124 (shown in FIG. 4). The rotor assembly 138 includes a pair of rotor plates 196, 198 that are spaced apart by a spacer 200. In the example, the plates 196, 198 and the spacer 200 each have a square center opening that is configured to couple to the rotatable shaft 132 (shown in FIG. 4). In other examples, a spline connection can be utilized as required or desired. For example, the spacer can have a center opening shaped for a spline that is on the rotatable shaft 132 and the spacer can have a first end that engages with a first plate and a second end that engages with a second plate, and the first end and the second end can be different from one another. The spacer 200 has projections 202 disposed on each side that are shaped and sized to align with corresponding holes 204 on each plate 196, 198. In an aspect, the projections 202 are asymmetrically spaced with regards to each other. Accordingly, the plates 196, 198 can only be attached in a specific orientation so that the plates 196, 198 can align with each other. This configuration increases assembly efficiencies of the rotor assembly 138. In the example, the rotor plates 196, 198 are substantially circular. In other examples, the rotor plates 196, 198 can be any other shape as required or desired (e.g., triangular, square, etc.).

A plurality of conductors 142 are pivotably mounted between the rotor plates 196, 198 at fasteners 206 (e.g., through bolts) that extend through openings 208 in the plates 196, 198. In an aspect, three conductors 142 are included in the rotor assembly 138 and are formed from a non-ferritic material (e.g., a high grade aluminum for greater conductivity and increased braking performance). The conductors 142 include a pin 210 that is configured to be slidable received within tabbed openings 212 defined within each plate 196, 198. A spring tab 214 extends axially from the plates 196, 198 and is disposed proximate the tabbed openings 212. Each conductor 142 includes one or more biasing elements 216 (e.g., tension springs on each plate side) that are connected at one end to the pin 210 and at the other end to the tab 214. In operation, centrifugal forces induced on the conductors 142 from rotation of the rotor assembly 138 cause the conductors 142 to radially extend out from between the plates 196, 198. This movement generates braking forces due to interaction with a corresponding magnetic field, and the system is described further in U.S. Pat. Nos. 8,490,751 and 8,851,235.

In this example, the biasing elements 216 have loops or hooks at each end so they can directly engage with the pin 210 and the tab 214 without the need for connection plate elements. Furthermore, the tab 214 is integral with the plates 196, 198 so as to reduce the number of components and to simplify structural support of the conductors 142. These configurations increase assembly efficiencies of the rotor assembly 138. Additionally, by containing the components of the rotor assembly 138 with the plates 196, 198 the entire assembly is easier to handle and move in and out of the line dispensing device. In the example, the spring tab 214 is adjacent and forms part of the tabbed opening 212. In other examples, the spring tab 214 may be positioned outside from the opening 212, but still adjacent thereto.

Figure 7:
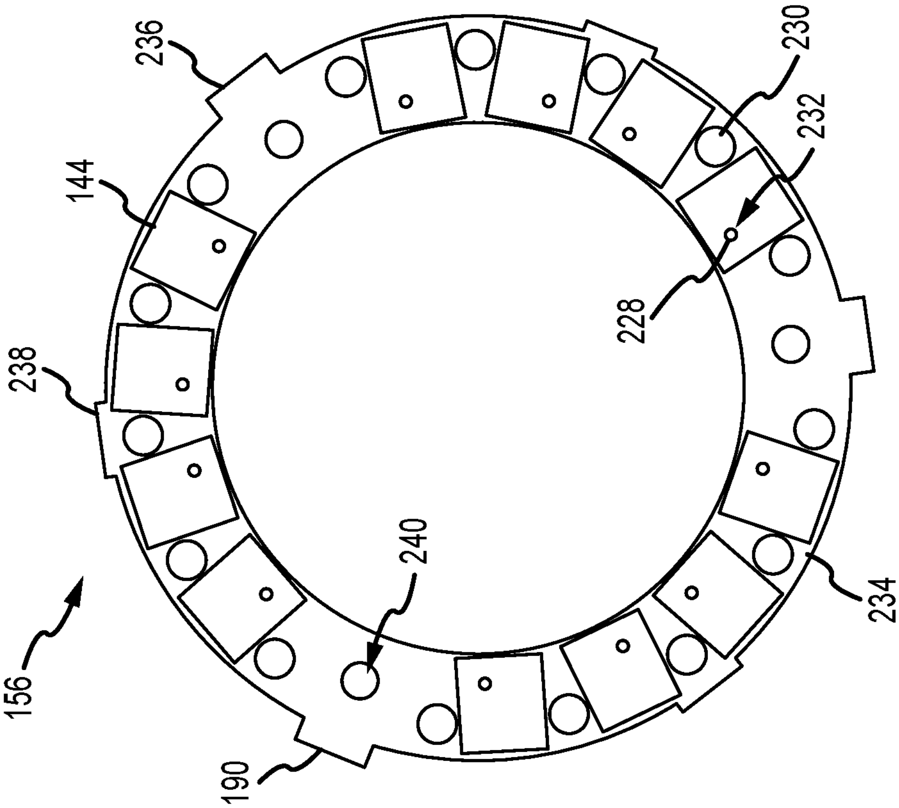
FIG. 7 is a plan view of an inside plate of the stator assembly of the braking assembly.
Figure 6:
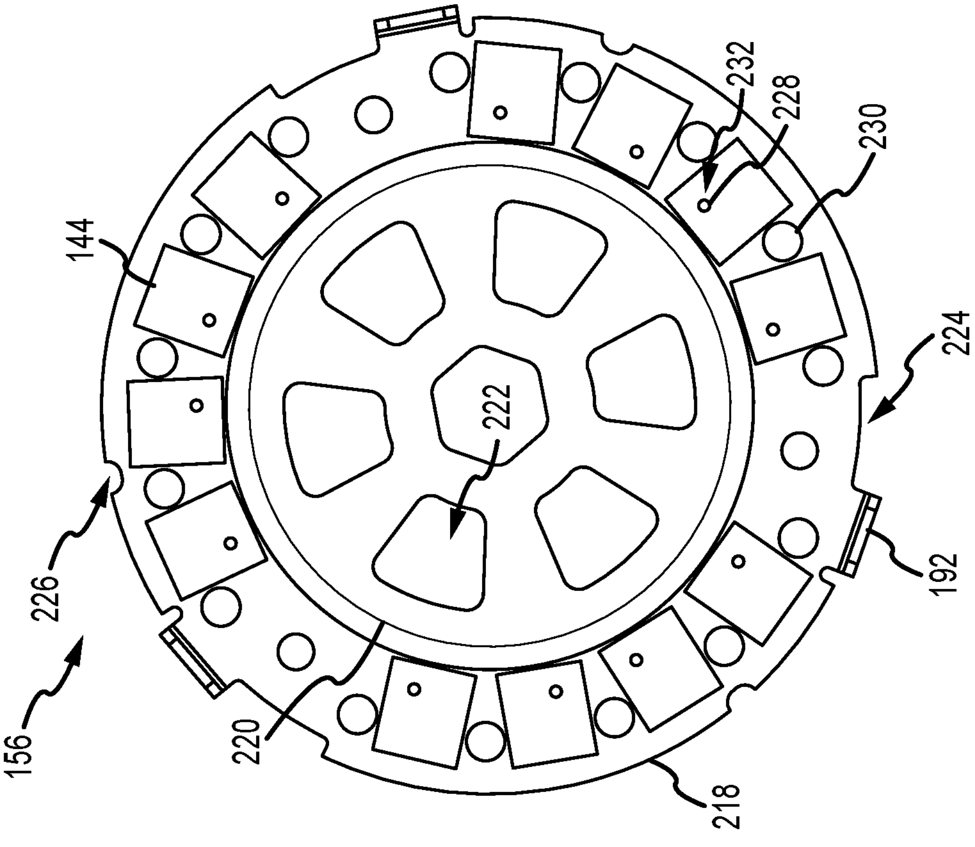
FIG. 6 is a plan view of an outside plate of a stator assembly of the braking assembly.

FIG. 6 is a plan view of the outside plate 158 of the stator assembly 140 of the braking assembly 124 (shown in FIG. 4). FIG. 7 is a plan view of the inside plate 156 of the stator assembly 140. Referring concurrently to FIGS. 6 and 7, both plates 156, 158 form the stator assembly and are configured to be coupled to the housing section 118 (shown in FIG. 4) so that they are fixed about the rotation axis. Magnets 144 are selectively coupled to the plates 156, 158 so that the stator assembly forms a magnetic field. In the example, the magnets 144 are arranged in alternating north-south polarities and are grouped together in three circumferential sections of four magnets apiece for a total of twelve. In another example, the magnets 144 may be equidistantly spaced around the circumference of the plates 156, 158 and alternating polarities. In this example, any number of magnets 144 can be used (e.g., 8, 9, 10, 11, 12, 13, 14, etc.). In an aspect, a total number of magnets 144 may be 14. When mounted in the stator assembly, the magnets 144 of each plate 156, 158 face each other with the gap 160 (shown in FIG. 3) formed therebetween. In an aspect, the illustrated number and layout of the magnets 144 increases performance and efficiency of the braking assembly. It should be appreciated that any other numbers and/or layouts of the magnets 144 can be used that enables the braking assembly to function as described herein. In the example, the magnets 144 can be a rare-earth magnet, such as, neodymium, so that the thickness and weight of the magnets 144 are reduced.

The outside plate 158 includes an outer ring section 218 that the magnets 144 are configured to mount to and an inner section 220. The inner section 220 restricts access to the rotor assembly 138 (shown in FIG. 5) when the braking assembly is installed in the line dispensing device and has a plurality of openings 222 so as to provide ventilation for the braking assembly. In other examples, the inner section 220 may be substantially solid with few or no openings 222. For example, the openings 222 may be less than 10%, or less than 5%, of the total surface area of the inner section 220. The outer perimeter of the outer ring section 218 includes male pins 192 that enable the outside plate 158 to be mounted to the housing section 118 (shown in FIG. 4). The male pins 192 extend substantially orthogonally from the outer ring section 218. In the example, the male pins 192 are at least partially received by the female receptors 188 of the housing section 118 (shown in FIG. 4) so that the outside plate 158 is mounted to the housing and can be offset and spaced from the inside plate 156. Adjacent the male pins 192, the outer perimeter of the outer ring section 218 includes a cutout 224 that receives a portion of the female receptors 188 to further secure the placement of the outside plate 158 in the housing. In other examples, the one or more protrusions (not shown) may extend within the cutout 224 and are configured to engage with the housing as required or desired. The outer perimeter of the outer ring section 218 can also include one or more notches 226 that receive at least a portion of the fastener 194 (shown in FIG. 4) so that the outside plate 158 can be fastened to the housing.

The outer ring section 218 also includes a plurality of keys 228 extending therefrom and a plurality of lugs 230 extending therefrom. The keys 228 and the lugs 230 are configured to correctly place and space the magnets 144 attached thereto. The lugs 230 are circumferentially arranged so that a magnet 144 can be placed between a pair of lugs 230. As such, the correct array of magnets 144 are easily achieved when the stator assembly is being assembled. The magnets 144 themselves are magnetically coupled to the outside plate 158 and adhesive or glue is not necessarily required. The lugs 230 also restrict or prevent circumferential movement of the magnets 144 on the outer ring section 218. Additionally, because the plate 158 is stationary in the line dispensing device, the thickness of the plate 158 can be reduced to save weight without attenuating braking power. In the example, the lugs 230 are substantially cylindrical in shape. In other examples, the lugs 230 can be of any other shape as required or desired.

Each magnet 144 includes an aperture 232 that is configured to receive the key 228. The aperture 232 is offset from a centerline of the magnet 144 and the key 228 is disposed between the pair of lugs 230, but also offset from a centerline between the pair of lugs 230. This arrangement of the keys 228 requires a predetermined placement of the magnets 144 so as to ensure the correct north-south polarity at the specific location on the plate 158. That is, the structure of the plate 158 (e.g., via the keys 228, the lugs 230, and the apertures 232) forces the magnets 144 to be installed in the correct polarity, because if the polarity is reversed, the keys 228 do not align with the apertures 232.

The inside plate 156 also includes an outer ring section 234 that the magnets 144 are configured to mount to. In the example, the inner section of the inside plate 156 is free from any structure to reduce weight thereof. The outer perimeter of the outer ring section 234 includes male pins 190 that enable the inside plate 156 to be mounted to the housing section 118. In the example, the male pins 190 include radially long pins 236 and radially short pins 238 that both selectively engage with the female receptors 188 of the housing section 118 so as to ensure proper plate 156 placement. Additionally or alternatively, one or more notches (not shown but similar to the notch 226 shown in the plate 158) may be defined on the outer perimeter of the outer ring section 234 and used to orient the inside plate 156 with respect to the housing. The inside plate 156 also includes one or more holes 240 that receive the fastener 186 (shown in FIG. 4) so as to secure the plate 156 to the housing section 118 at the mounting posts 184 (shown in FIG. 4).

The inside plate 156 also includes keys 228 and lugs 230 to ensure assembly of the stator assembly in the correct north-south polarity configuration of the magnets 144. The male pins 190, 192 of each plate 156, 158 are configured to selectively engage with the housing section 118 so that the plates 156, 158 and magnets 144 can only be mounted in a single orientation and to prevent incorrect assembly. In an aspect, both plates 156, 158 can be formed from a ferritic material so that the magnets 144 are attracted to the plate and can be attached without glue, and the thickness of both the outside plate 158 and the inside plate 156 can be substantially equal so as to increase manufacturing efficiencies.

Figure 8:
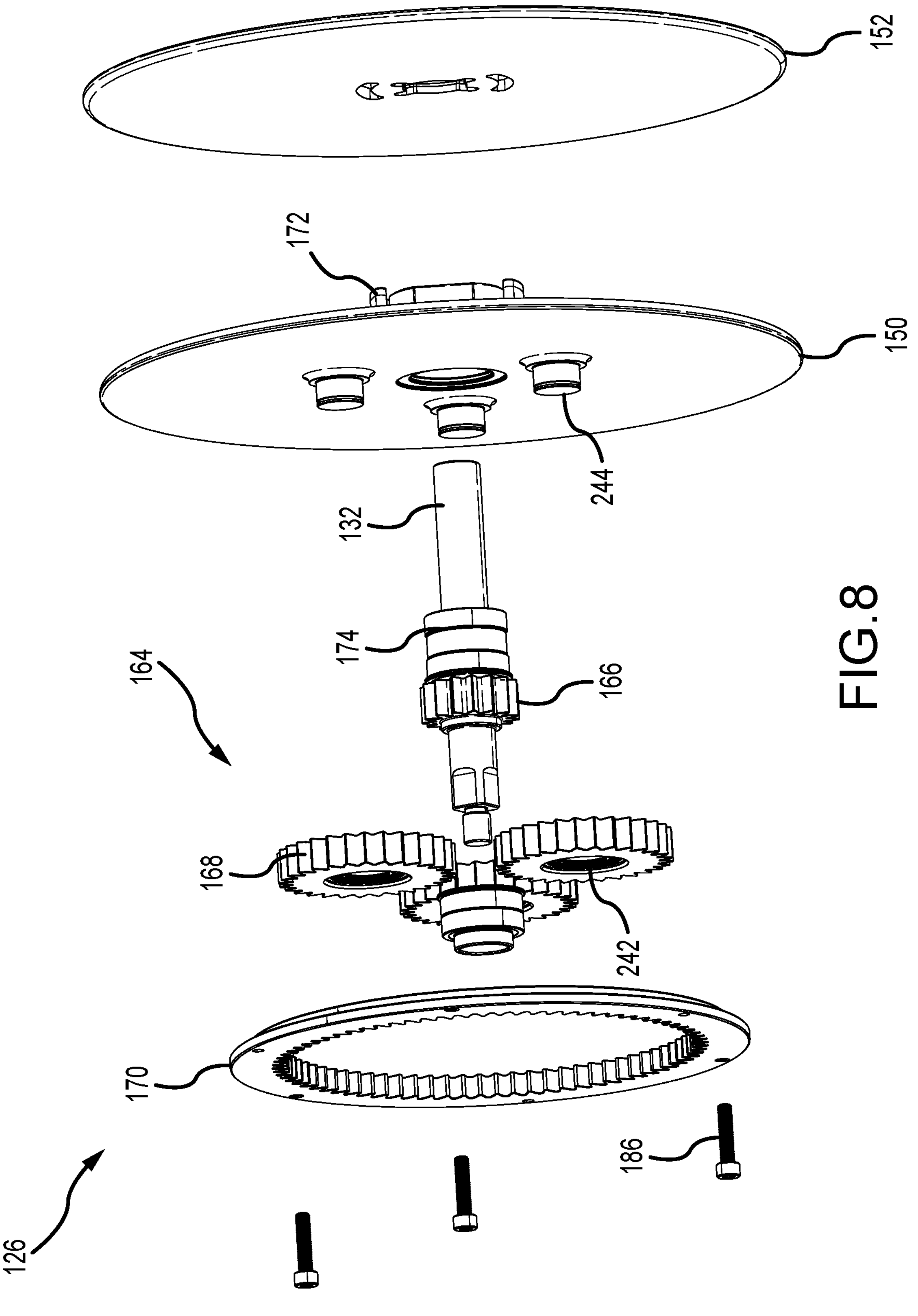
FIG. 8 is an exploded perspective view of a line drum of the line dispensing device.

FIG. 8 is an exploded perspective view of the line drum 126. The line drum 126 is configured to house the main line 102 (shown in FIG. 1) as it extends and retracts from the line dispensing device. As the line extends and retracts from the line dispensing device, the line drum 126 rotates around the rotational axis 154 (shown in FIG. 3) and drives corresponding rotation of the rotatable shaft 132. In the example, the line drum 126 includes a pair of drum plates 150, 152 that are spaced apart from one another so that the line can be disposed therebetween. The drum plate 150 includes the hub 172 extending from one side that the line is wrapped around. The hub 172 is mounted to the rotatable shaft 132 by bearings 174. The bearings 174 enable the hub 172 and the drum plate 150 to rotate around the rotational axis and the rotatable shaft 132 to rotate. However, the hub 172 and the drum plate 150 can also rotate relative to the rotatable shaft 132 and at a different rotational speed.

The line drum 126 also includes the transmission 164 that translates rotation of the hub 172 and drum plate 150 to rotation of the rotatable shaft 132. The transmission 164 includes the internal gear 170 that is statically mounted to the housing section 118 (shown in FIG. 3) by fasteners 186. In an aspect, fasteners 186 are used to mount both the inside plate 156 of the stator assembly 140 (shown in FIG. 4) and the internal gear 170 to the housing section. The sun gear 166 is coupled to the rotatable shaft 132 and rotatable around the rotational axis of the shaft. Meshed with both the internal gear 170 and the sun gear 166 are three planet gears 168. Each planet gear 168 is rotatably mounted to the drum plate 150 with bearings 242 on a shaft projection 244. The shaft projections 244 extend on the opposite side of the drum plate 150 from the hub 172 and are positioned radially outward from the rotational axis. In operation, rotation of the drum plate 150 via the extension and retraction of the line, drives rotation of the rotatable shaft 132 via the transmission 164. In an aspect, the transmission 164 may increase the rotational speed of the shaft 132 from the drum plate 150. In other examples, the transmission 164 can decrease the rotational speed, or maintain substantially the same rotational speed, of the shaft 132 from the drum plate 150, as required or desired. The rotational speed of the shaft 132 is based on the gear ratio between the gears 166, 168, and 170.

In the example, three planet gears 168 are shown and by using a plurality of planet gears 168 a redundant load bearing system is formed. Additionally, by transferring torque over three gears 168 instead of one gear, the torque is distributed over three components instead of one component so that the life-cycle of the transmission 164 is increased. Furthermore, the transmission 164 can operate with increased torque loads. It should be appreciated that any other number of planet gears, for example, two, four, five, etc., can also provide similar benefits to the transmission 164 described herein.

Figure 9:
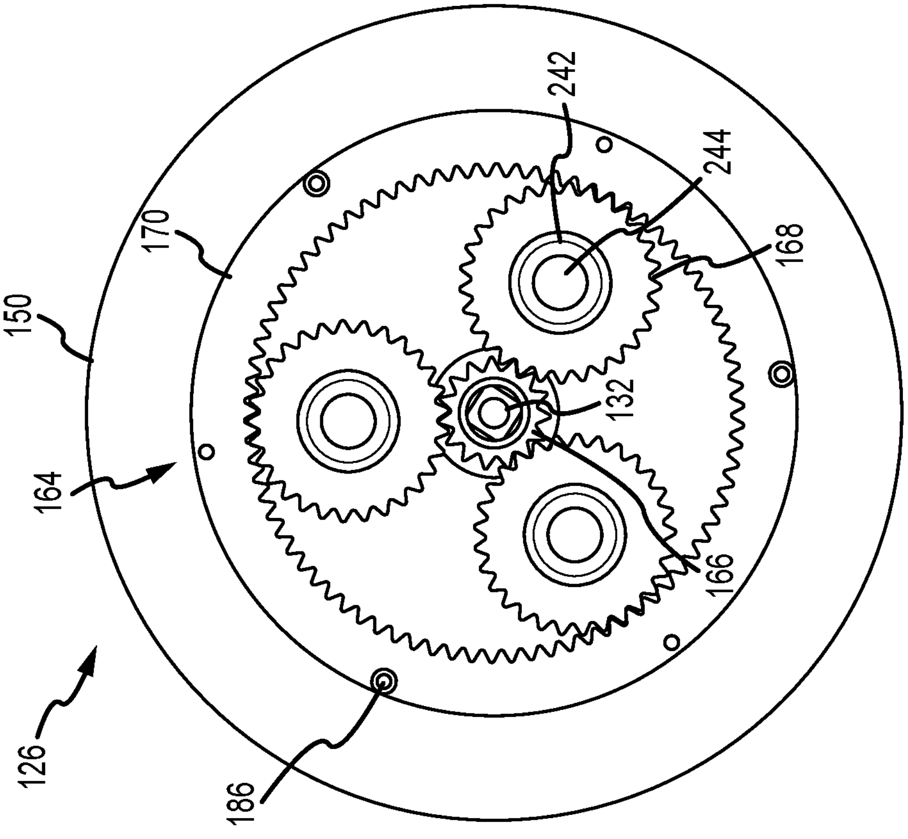
FIG. 9 is a plan view of a transmission of the line drum.

FIG. 9 is a plan view of the transmission 164 of the line drum 126. Certain components are described above, and thus, are not necessarily described further. As illustrated in FIG. 9, the planet gears 168 are disposed radially outward from the rotatable shaft 132. Each planet gear 168 is coupled to the drum plate 150 and has its own rotation axis that is substantially parallel to, but radially offset, from the rotation axis of the rotatable shaft 132. In the example, the internal gear 170 is mounted and fixed to the housing section 118 (shown in FIG. 3). In other examples, the internal gear 170 may be mounted to the drum plate 150 to drive rotation of the rotatable shaft 132 and the planet gears 168 floating between. The internal gear 170, the sun gear 166, and the rotatable shaft 132 are all co-axial. Additionally, the transmission 164 (e.g., internal gear 170, planet gears 168, and sun gear 166) are all aligned on the same reference plane.

Figure 10:
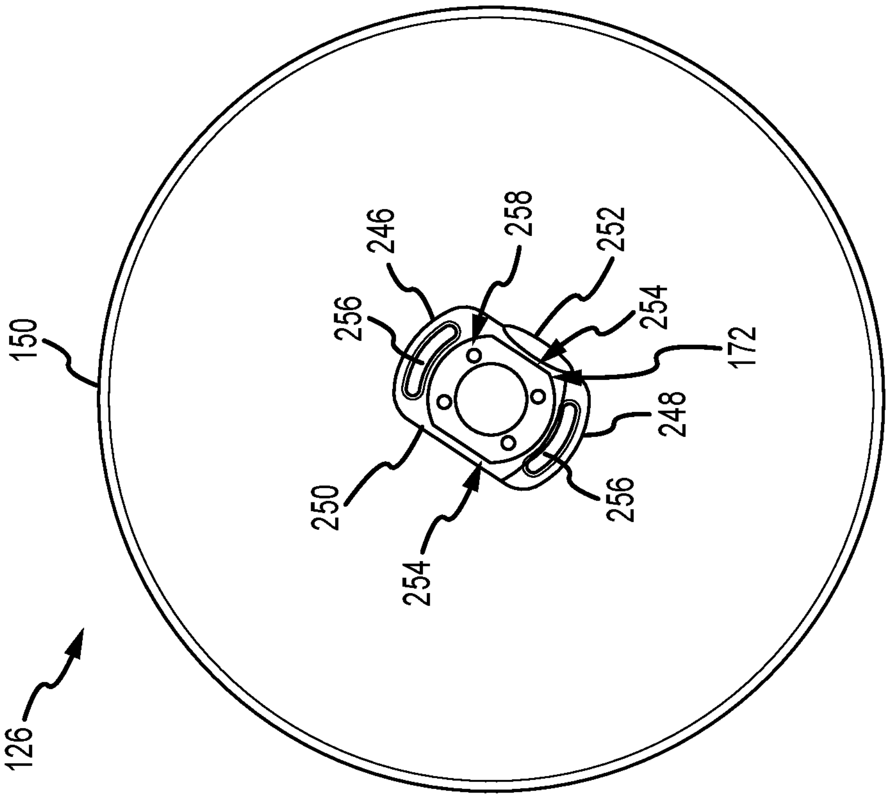
FIG. 10 is a plan view of a hub of the line drum.

FIG. 10 is a plan view of the hub 172 of the line drum 126 (shown in FIG. 8). The hub 172 extends from the drum plate 150 and is co-axial with the rotatable shaft 132 (shown in FIG. 9). The hub 172 and the drum plate 150 are configured to house the main line 102 (shown in FIG. 1) and the line 102 is wrapped at least partially around the hub 172. In the example, the line 102 is coupled to the hub 172 by a short webbing 246. This configuration enables for the line 102 to be replaced as required or desired without disassembly of the line dispensing device. The short webbing 246 includes a loop 248, a thickened reinforced section 250, and a shackle 252. The shackle 252 is used to attach the main line 102 to the short webbing 246. The hub 172 includes two opposing planer surfaces 254 and two opposing arcuate projections 256 spaced from the hub 172. In operation the loop 248 of the short webbing 246 is coupled to one arcuate projection 256 without the requirement of a pin.

When the short webbing 246 is wrapped around the hub 172, the thickened reinforced section 250 and the shackle 252 are thicker sections that can form bumps in the line 102 as it wraps around the hub 172. As such, the planer surfaces 254 are used so that when the short webbing 246 is wrapped around the hub 172, the thickened reinforced section 250 and the shackle 252 are disposed proximate the planer surfaces 254 so that the line 102 can more concentrically wrap around the hub 172 without any undesirable bumps. That is, the planer surfaces 254 form space in the hub 172 for the thickened reinforced section 250 and shackle 252 to sit within the line drum. The hub 172 also includes one or more openings 258 that are configured to receive fasteners 176 (shown in FIG. 3) for coupling the other drum plate 152 (shown in FIG. 8) to the hub 172. The configuration of the hub 172 and the transmission 164 (shown in FIG. 9) are also configured so that the line drum can only be installed in one configuration to increase assembly efficiencies.

Figure 11:
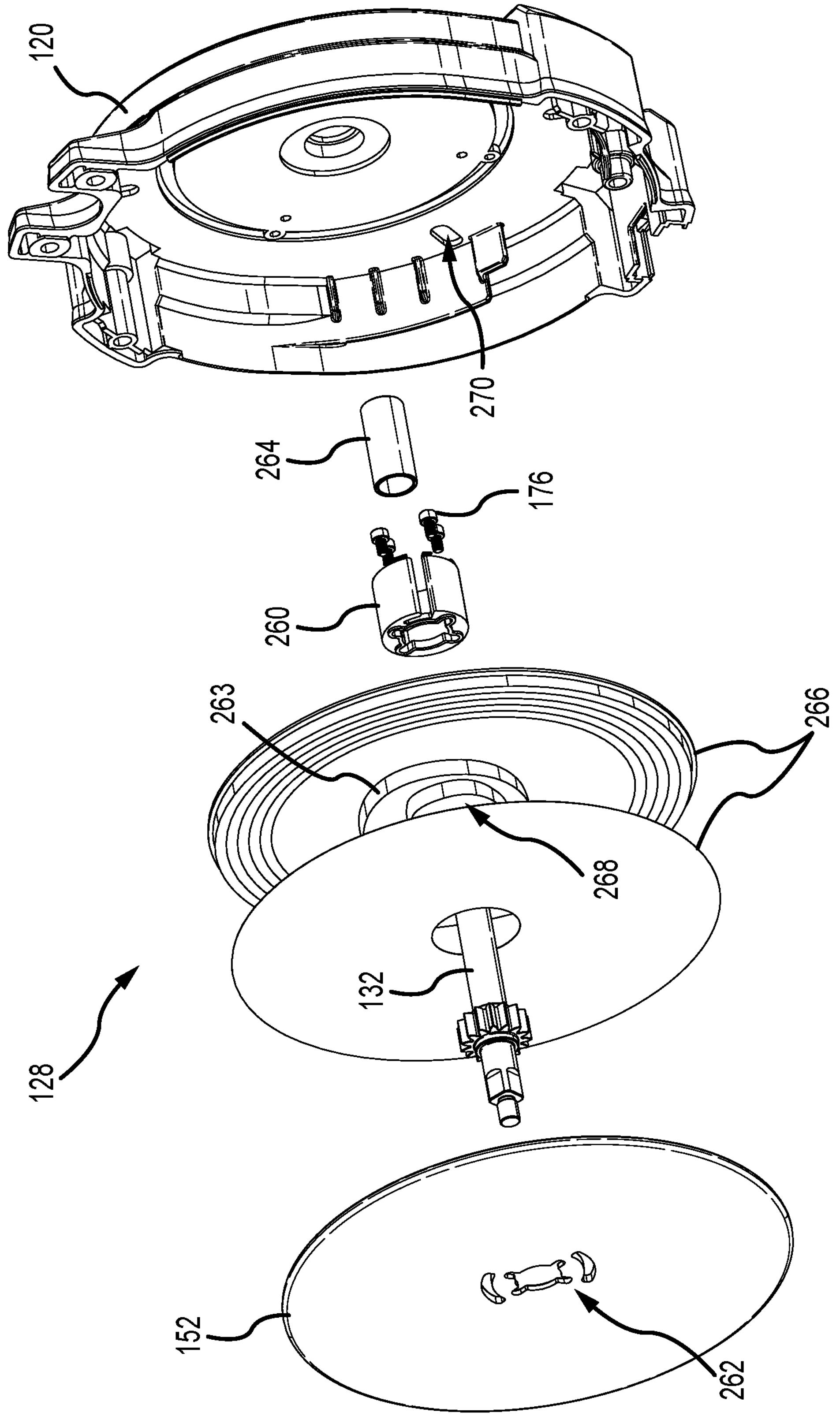
FIG. 11 is an exploded perspective view of a retraction assembly of the line dispensing device.

FIG. 11 is an exploded perspective view of the retraction assembly 128. The retraction assembly 128 is coupled to the drum plate 152 of the line drum 126 (shown in FIG. 8) and is configured to rotate the line drum 126 to retract the main line 102 (shown in FIG. 1) into the line dispensing device. The retraction assembly 128 includes a hub 260 that couples to the hub 172 of the line drum 126 (shown in FIG. 10) with fasteners 176 so that the hub 260 rotates directly therewith. In the example, the drum plate 152 has one or more center openings 262 that can receive features of the hub 172. The hub 260 couples to a coil spring 263 that provides the retracting force for the system. A spacer 264 is disposed between the hub 260 and the rotatable shaft 132 so that while the hub 260 is co-axial with the rotatable shaft 132 each component can rotate at different speeds. In the example, the hub 260 couples to the drum plate 152. In other examples, the hub 260 may be integrally formed with the drum plate 152.

In the example, the coil spring 263 of the retraction assembly 128 is axially positioned between two plates 266. The plates 266 can be formed from a flexible light weight plastic-based material that is not coupled to the coil spring or the hub 260. By sandwiching the coil spring 263 between two plates 266, the coil spring 263 can more easily be assembled onto and removed from the hub 260 without the coil spring 263 axially de-coiling. In an aspect, the plates 266 are identically circular in shape with a center opening 268 that the hub 260 is disposed within. In another aspect, the plates 266 may have different shapes and/or each plate 266 may have a different shape. The plates 266 also enable the coil spring 263 to be more easily inspected without disassembly and removal. For example, the housing section 120 may include one or more slots 270 that allow the coil spring 263 within the plates 266 to be inspected and that assist in removing the coil spring 263 from the housing.

Figure 12:
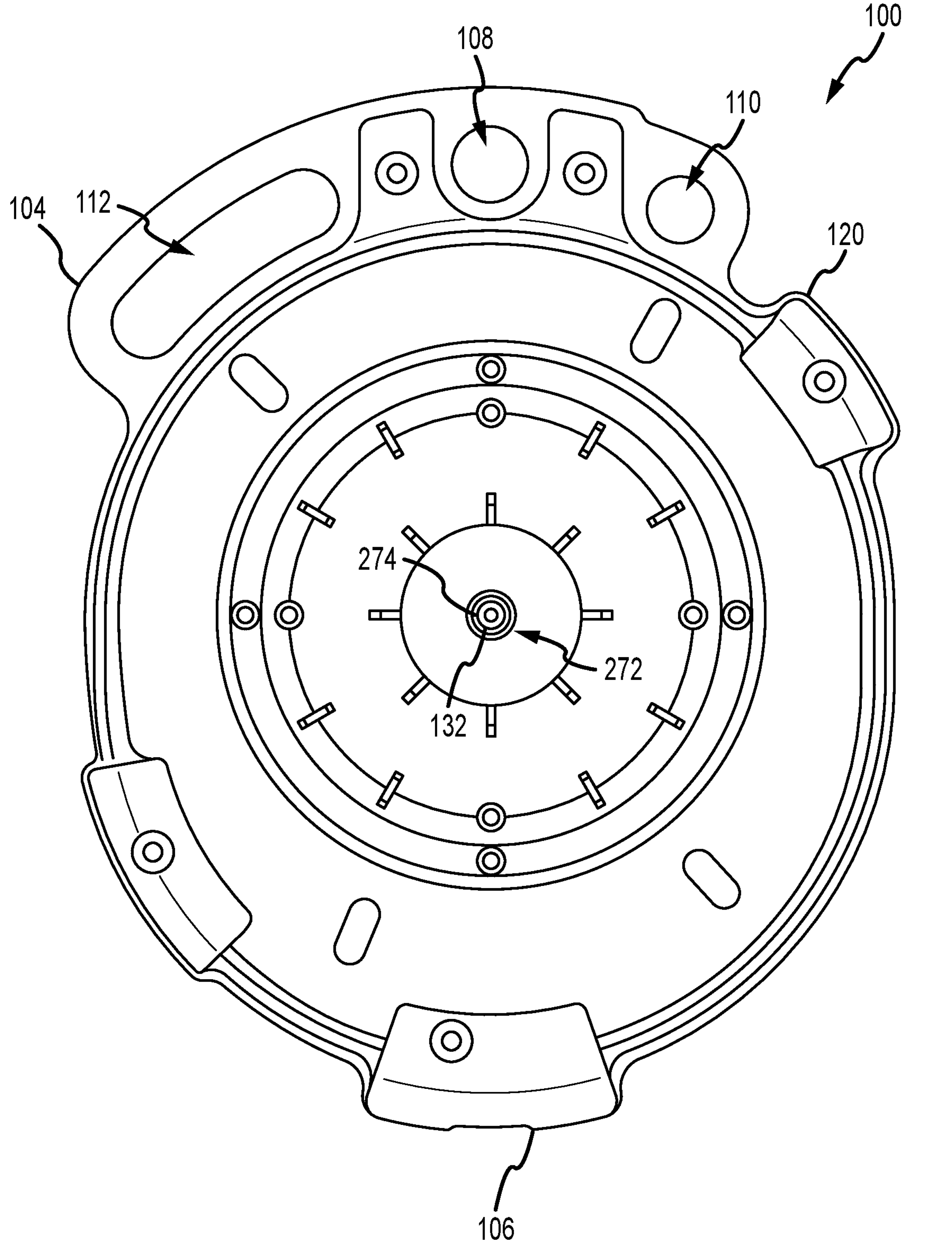
FIG. 12 is another side view of the line dispensing device.

FIG. 12 is another side view of the line dispensing device 100. Certain components are described above, and thus, are not necessarily described further. Additionally, the cover 116 (shown in FIG. 1) has been removed for clarity. The housing section 120 has a center opening 272 that aligns with the rotatable shaft 132. The opening 272 allows access to the rotatable shaft 132 from the exterior of the housing 104 as required or desired. For example, the rotatable shaft 132 may include a female spline connector 274 that allows another shaft to be coupled thereto and rotation driven. It should be appreciated that the rotatable shaft 132 may include any other type of connector that allows another shaft to be coupled to it and rotational movement transferred therebetween. This accessibility to the rotatable shaft 132 allows for accessory mechanism(s) to be coupled to the line dispensing device 100. In an aspect, a secondary braking device (e.g., an electromagnetic braking device) may be coupled to the line dispensing device 100 to provide lock-off functionality as described in U.S. Provisional Patent Application No. 62/903,385, filed Sep. 20, 2019, and that is incorporated herein by reference in its entirety. In another aspect, a counter mechanism can be attached to the line dispensing device 100 so as to count, for example, loading cycles or climber cycles.

Figure 13:
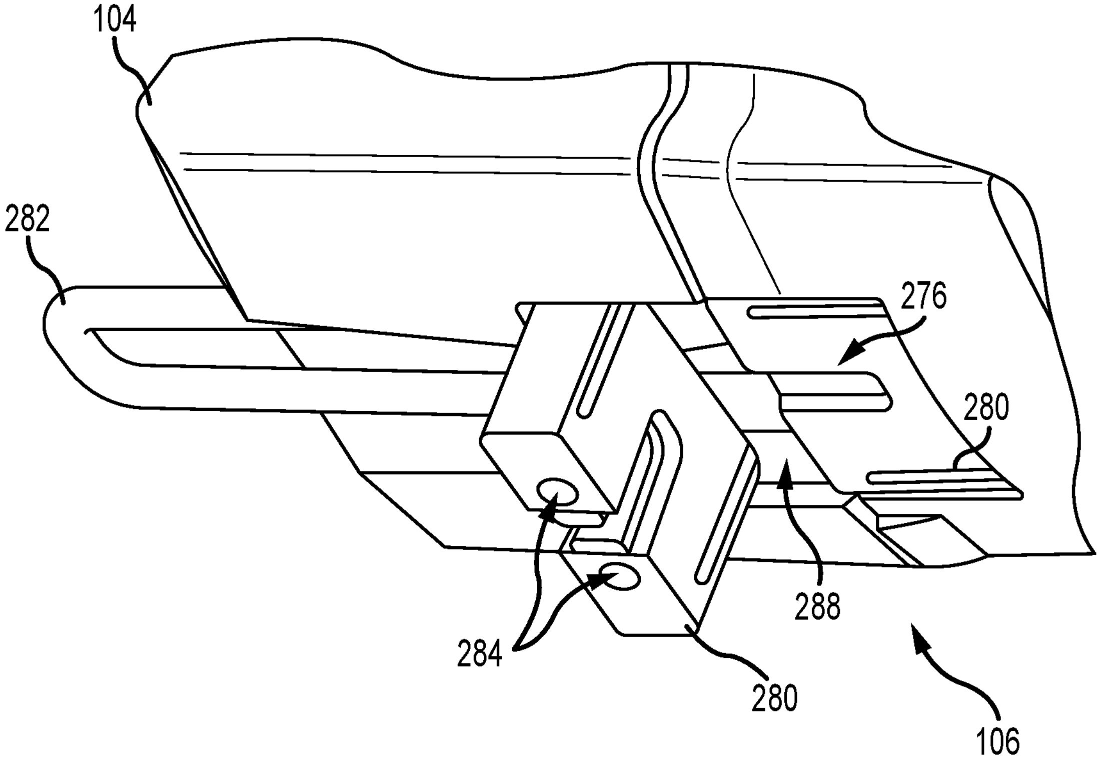
FIG. 13 is a perspective view of a nozzle in a partially open configuration.
Figure 14:
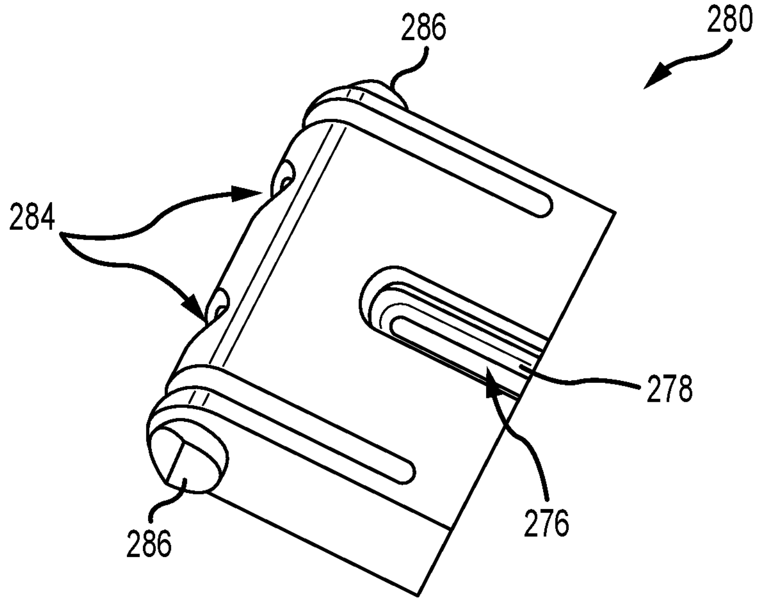
FIG. 14 is a perspective view of a portion of the nozzle.

FIG. 13 is a perspective view of the nozzle 106 in a partially open configuration. FIG. 14 is a perspective view of a portion of the nozzle 106. Referring concurrently to FIGS. 13 and 14, the nozzle 106 is disposed at the bottom of the housing 104 and is the location where the main line 102 (shown in FIG. 1) extends from the housing 104. The nozzle 106 defines a slit 276 that the line 102 extends through. In the example, the slit 276 is lined with a low-fiction liner 278 so as to reduce wear on the line and to reduce or prevent twisting of the line during use. The nozzle 106 is formed from two covers 280 that engage with the housing 104 and a pin 282 that locks the covers 280 in place. When the pin 282 is removed, the covers 280 can pivot open relative to the housing 104 so as to allow access to the line disposed therein. For example, the nozzle 106 is opened to replace the line and access the shackle 252 on the short webbing 246 (shown in FIG. 10). The covers 280 can then close back up and locked via the pin 282 extending through holes 284. Each cover 280 can include a pivot pin 286 that engages with the housing 104 and allows the cover 280 to pivot between an open and a closed configuration. In some examples, the cover 280, via the pivot pins 286, can slide within a track 288 defined in the housing 104 as required or desired. By engaging the covers 280 with the housing 104, the nozzle 106 stays attached to the housing 104 during opening, thereby increasing accessibility to the line and decreasing lost components during maintenance operations. In some examples, the pivot pins 286 can be formed on a resilient arm so that the covers 280 can be releasably coupled to the track 288.

Figure 15:
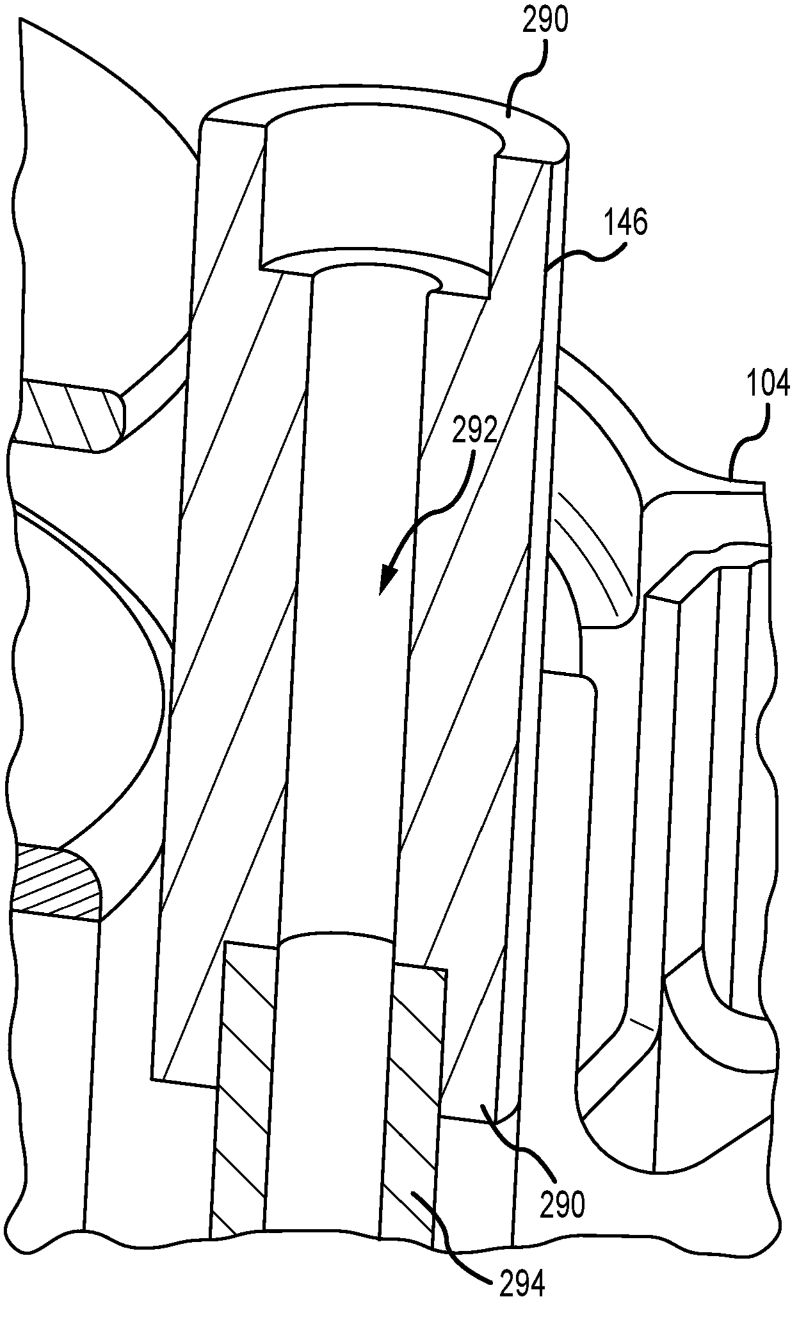
FIG. 15 is a partial cross-sectional view of a guide roller.

FIG. 15 is a partial cross-sectional view of the guide roller 146. The guide roller 146 is disposed within the housing 104 proximate to the nozzle 106 (shown in FIGS. 13 and 14) so as to guide the main line (shown in FIG. 1) as it extends from and retracts into the housing 104. The guide roller 146 is substantially cylindrical with two symmetric ends 290 that have a countersunk bore. Additionally, a through hole 292 extends the entire length of the guide roller 146. The guide roller 146 is supported by the fastener 148 (shown in FIG. 2) that extends through the through hole 292 and is freely rotatable therearound. Both housing sections 118, 120 have a shoulder 294 that the ends 290 of the guide roller 146 can be supported on. This increases assembly efficiencies of the line dispensing device as it is easier to keep the roller 146 properly positioned with when coupling together the housing sections.

Figure 16:
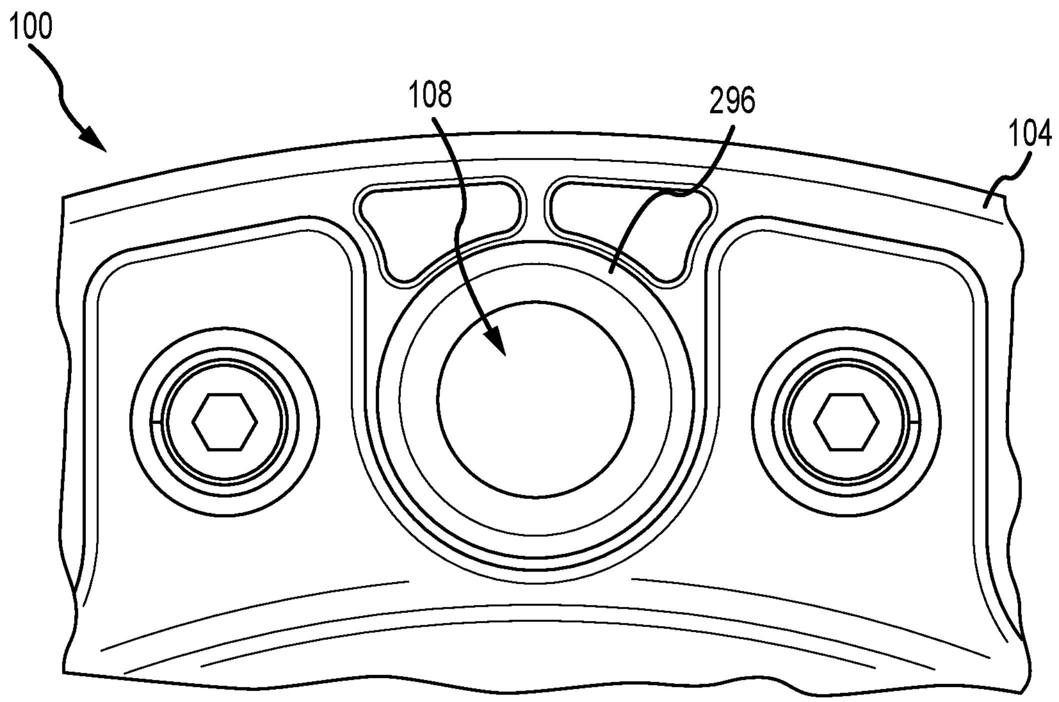
FIG. 16 is a side view of a mount damper coupled to a housing of the line dispensing device.
Figure 17:
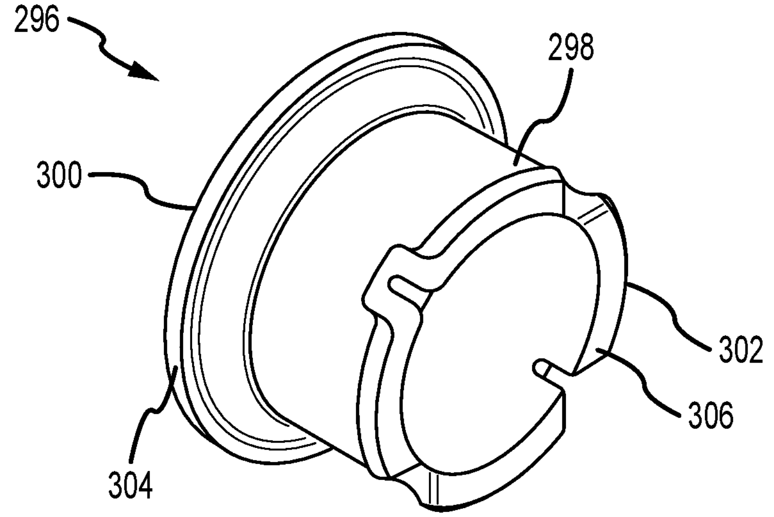
FIG. 17 is a perspective view of the mount damper.

FIG. 16 is a side view of a mount damper 296 coupled to the housing 104 of the line dispensing device 100. FIG. 17 is a perspective view of the mount damper 296. Referring concurrently to FIGS. 16 and 17 and as described above in reference to FIG. 1, bushings my line one or more mounting apertures 108 that are used to couple the line dispensing device 100 to a support structure. The bushing decreases wear on the housing 104 from the coupling device used and are replaceable as required or desired. Additionally, the bushing can decrease friction and reduce dynamic vibrations on the coupling device. In this example, the mount damper 296 is one example of a bushing that can be used with the line dispensing device 100.

The mount damper 296 has a substantially hollow cylindrical body 298 with a first end 300 and a second end 302. The first end 300 has a first flange 304 extending therefrom and the flange 304 is continuous around the perimeter of the first end 300. The second end 302 has a second flange 306 extending therefrom and the flange 306 is discontinuous around the perimeter of the second end 302. For example, the second flange 306 is separated into four discrete sections. The flanges 304, 306 protect at least a portion of the sides of the housing 104 from the coupling device. Additionally, the body 298 is formed from an elastomeric material so that the second flange 306 can be inserted into the aperture 108 by at least partially compressing its diameter to be smaller than the aperture 108 via the sectional second flange 306.

In operation, the coupling devices (e.g., carabiner) utilized to couple the line dispensing device 100 to a support structure can induce wear on the housing 104 at the mounting aperture 108. The mount damper 296 is a sacrificial component that is easily replaceable to protect the housing 104 and absorb the wear from the coupling device. Additionally, the mount damper 296 provides shock absorption such that vibrations are reduced or prevented from being transmitting between the housing 104 and the coupling device.

Figure 18:
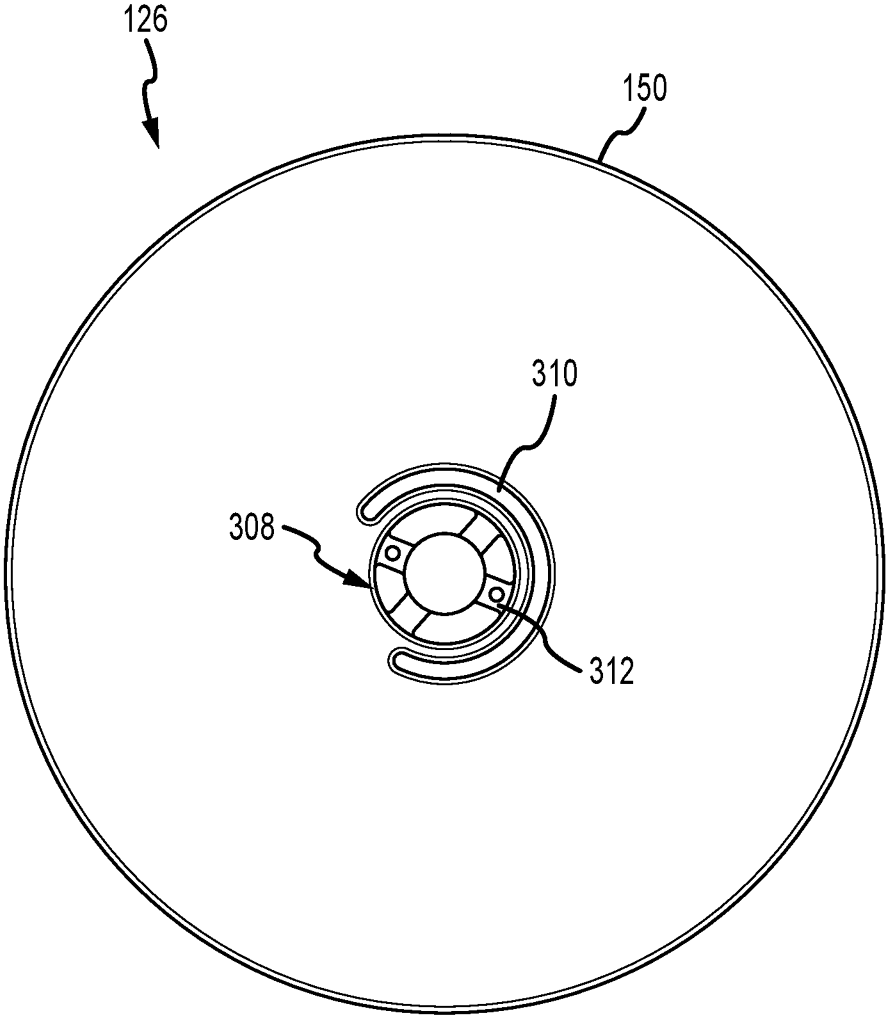
FIG. 18 is a plan view of another hub that can be used with the line drum shown in FIG. 8.

FIG. 18 is a plan view of another hub 308 that can be used with the line drum 126 (shown in FIG. 8). Similar to the example described above in FIG. 10, the hub 308 extends from the drum plate 150 and is co-axial with the rotatable shaft 132 (shown in FIG. 9). The hub 308 and the drum plate 150 are configured to house the main line 102 (shown in FIG. 1) and the line 102 is wrapped at least partially around the hub 308. In this example, the hub 308 is cylindrical with a single arcuate projection 310 spaced from the hub 308. In an aspect, the projection 310 may extend between about 180° to 340° around the hub 308. In another aspect, the projection 310 may extend approximately 290° around the hub 308. In operation, the projection 310 is utilized to attach the line 102 to the hub 308. In some examples, a short webbing can be used. The free end of the hub 308 can include one or more lugs 312 used to engage and transfer rotation to the other drum plate 152 (shown in FIG. 8).

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A line dispensing device comprising:

a housing having a first body and a second body coupled together, the first body different than the second body with the first body including a base wall and the second body including an outer wall, the first body coupled to the second body such that a first cavity is defined between the base wall of the first body and the outer wall of the second body and a second cavity is defined by the base wall of the first body;

a rotatable shaft rotatably supported by the housing within the first cavity and defining a rotational axis, wherein the rotatable shaft is supported by bearings disposed on the base wall of the first body and the outer wall of the second body such that one end of the rotatable shaft is cantilevered into the second cavity, the first cavity discrete from the second cavity and adjacent to one another along the rotational axis;

a line drum disposed within the first cavity about the rotational axis and configured to extend and retract a line from the housing;

a retraction assembly including a coil spring disposed within the first cavity about the rotational axis and coupled to the line drum, the retraction assembly configured to generate a retraction force and retract the line into the housing; and an eddy current braking assembly disposed within the second cavity about the rotational axis and configured to generate an eddy current braking force on the rotatable shaft and during extension of the line from the housing, wherein the eddy current braking assembly comprises:

a stator assembly coupled to the first body of the housing;

a rotor assembly coupled to the cantilevered portion of the rotatable shaft and rotatable around the rotational axis; and one or more conductors and one more magnets configured to generate the eddy current braking force.

2. The line dispensing device of claim 1, wherein the rotor assembly has the one or more conductors and the stator assembly has the one or more magnets.

3. The line dispensing device of claim 2, wherein the stator assembly comprises a pair of plates each having a plurality of keys extending therefrom, and wherein the one or more magnets are coupled to the pair of plates and the plurality of keys at least partially define a polarity orientation of the one or more magnets.

4. The line dispensing device of claim 1, wherein the line drum is coupled to the rotatable shaft and rotatable around the rotational axis, and wherein the line drum is rotatable around the rotational axis at a different speed than the rotatable shaft.

5. The line dispensing device of claim 1, further comprising a transmission coupled between the line drum and the rotatable shaft so that rotation of the line drum drives rotation of the rotatable shaft.

6. The line dispensing device of claim 1, wherein the retraction assembly is rotatable around the rotational axis, and wherein the retraction assembly is rotatable around the rotational axis at a different speed than the rotatable shaft.

7. The line dispensing device of claim 1, wherein one end of the rotatable shaft comprises a female spline connector configured to receive another exterior shaft and drive rotation thereof.

8. The line dispensing device of claim 1, wherein the line drum includes:

a pair of drum plates; and a hub supported on the rotatable shaft and disposed between the pair of drum plates, the hub including a pair of opposing planar surfaces and a pair of opposing arcuate projections spaced from the hub, the pair of opposing planer surfaces and the pair of opposing arcuate projections circumferentially alternating around the rotational axis, and wherein the line is coupled to the hub via a short webbing attached to one of the arcuate projections.

9. The line dispensing device of claim 1, wherein the stator assembly comprises a pair of plates supporting a plurality of magnets of the one or more magnets, wherein the pair of plates each include a plurality of lugs circumferentially spaced around the rotational axis and keys disposed between a pair of lugs of the plurality of lugs, the respective key offset between the pair of lugs, and wherein each of the plurality of magnets includes an offset aperture configured to receive the key, wherein each of the plurality of magnets is coupled to the respective plate at the keys such that a predetermined polarity is ensured, and wherein the rotor assembly includes the one or more conductors.

10. A line dispensing device comprising:

a housing having a first body and a second body defining an interior cavity, the first body also defining an external cavity separated from the interior cavity;

a rotatable shaft rotatable around a rotational axis, the rotatable shaft disposed within the interior cavity and rotatably supported between the first body and the second body, wherein one end of the rotatable shaft cantilevers into the external cavity, the interior cavity and the external cavity adjacent one another along the rotational axis;

a line drum housing a line supported on the rotatable shaft, disposed in the interior cavity and configured to rotate about the rotational axis during extension and retraction of the line, wherein the line drum includes:

a pair of drum plates; and a hub supported on the rotatable shaft and disposed between the pair of drum plates, the hub including a pair of opposing planer surfaces and a pair of opposing arcuate projections spaced from the hub, the pair of opposing planer surfaces and the pair of opposing arcuate projections circumferentially alternating around the rotational axis, and wherein the line is coupled to the hub via a short webbing attached to one of the arcuate projections;

a transmission extending disposed within the interior cavity between the line drum and the rotatable shaft so that rotation of the line drum drives corresponding rotation of the rotatable shaft; and a braking assembly disposed about the rotational axis and configured to generate a braking force on the rotatable shaft and during extension of the line from the housing, the braking assembly disposed within the external cavity, wherein the braking assembly comprises:

a stator assembly coupled to the first body of the housing; and a rotor assembly coupled to the cantilevered portion of the rotatable shaft and rotatable around the rotational axis.

11. The line dispensing device of claim 10, wherein the transmission comprises:

a sun gear coupled to the rotatable shaft;

an internal gear co-axial with the sun gear and fixed relative to the rotational axis; and a plurality of planet gears meshed with the sun gear and the internal gear, wherein the plurality of planet gears are supported on the line drum.

12. The line dispensing device of claim 10, wherein the housing has a nozzle that the line extends through, wherein the nozzle includes a pair of covers that are pivotably coupled to the housing.

13. The line dispensing device of claim 12, further comprising a guide roller proximate the nozzle, wherein the guide roller is rotatably supported by a pair of shoulders defined by the housing.

14. The line dispensing device of claim 10, further comprising a retraction assembly coupled to the line drum, wherein the retraction assembly comprises:

a coil spring coupled to the hub; and a pair of flexible plates sandwiching the coil spring therebetween.

15. A line dispensing device comprising:

a housing defining an interior cavity and an external cavity;

a rotatable shaft rotatably supported by the housing and defining a rotational axis, wherein one end of the rotatable shaft is cantilevered within the external cavity;

a line drum disposed about the rotational axis within the interior cavity and configured to extend and retract a line from the housing;

a transmission disposed within the interior cavity and extending between the line drum and the rotatable shaft so that rotation of the line drum drives corresponding rotation of the rotatable shaft;

a retraction assembly disposed about the rotational axis within the interior cavity and configured to generate a retraction force and retract the line into the housing; and a braking assembly at least partially disposed within the external cavity and configured to apply a braking force on the rotatable shaft and during extension of the line from the housing, the braking assembly separated from the line drum and the retraction assembly via the housing, wherein the braking assembly comprises:

a stator assembly coupled to the housing, the stator assembly comprising a pair of plates supporting a plurality of magnets, wherein the pair of plates each include a plurality of lugs circumferentially spaced around the rotational axis and keys disposed between a pair of lugs of the plurality of lugs, the respective key offset between the pair of lugs, and wherein each of the plurality of magnets includes an offset aperture configured to receive the key, wherein each of the plurality of magnets is coupled to the respective plate at the keys such that a predetermined polarity is ensured; and a rotor assembly having one or more conductors coupled to the cantilevered portion of the rotatable shaft and rotatable around the rotational axis.

16. The line dispensing device of claim 15, wherein the pair of plates have an outer perimeter with one or more male pins that selectively engage with corresponding female receptors defined within the external cavity.

17. The line dispensing device of claim 15, wherein the rotor assembly comprises:

a pair of rotor plates having at least one bent tab extending therefrom;

the one or more conductors pivotably coupled to the pair of rotor plates; and at least one biasing element extending between the at least one bent tab and the one or more conductors.

18. The line dispensing device of claim 17, wherein the biasing element comprises hooks or loops at each end that directly engage with the at least one bent tab and the one or more conductors.

* * * * *